United States Patent
Yasui et al.

(10) Patent No.: US 7,200,449 B2
(45) Date of Patent: Apr. 3, 2007

(54) CONTROL SYSTEM FOR PLANT AND AIR-FUEL RATIO CONTROL SYSTEM FOR INTERNAL COMBUSTION ENGINE

(75) Inventors: Yuji Yasui, Wako (JP); Yoshihisa Iwaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 258 days.

(21) Appl. No.: 10/937,319

(22) Filed: Sep. 10, 2004

(65) Prior Publication Data

US 2005/0033456 A1 Feb. 10, 2005

Related U.S. Application Data

(62) Division of application No. 10/207,258, filed on Jul. 30, 2002, now Pat. No. 6,814,067.

(30) Foreign Application Priority Data

Aug. 6, 2001 (JP) ............................. 2001-238293

(51) Int. Cl.
*G05B 13/02* (2006.01)
*B60T 7/12* (2006.01)
(52) U.S. Cl. ......................................... 700/28; 701/103
(58) Field of Classification Search ................... 700/28, 700/29, 40, 71, 30, 31, 32, 73, 75, 78; 701/103, 701/109
See application file for complete search history.

(56) References Cited

U.S. PATENT DOCUMENTS

| 4,663,703 | A | * | 5/1987 | Axelby et al. ................. 700/29 |
| 5,119,288 | A | * | 6/1992 | Hiroi ............................. 700/43 |
| 5,537,310 | A | * | 7/1996 | Tanake et al. ................. 700/31 |
| 5,754,424 | A | * | 5/1998 | Melvin .......................... 700/37 |
| 6,049,739 | A | * | 4/2000 | Melvin .......................... 700/37 |
| 6,256,983 | B1 | | 7/2001 | Yasui |
| 6,445,961 | B1 | * | 9/2002 | Melvin .......................... 700/32 |
| 6,453,895 | B2 | | 9/2002 | Takahashi et al. ........... 123/681 |
| 6,619,277 | B2 | | 9/2003 | Katoh ......................... 701/109 |
| 6,814,067 | B2 | * | 11/2004 | Yasui et al. .................. 123/679 |
| 6,845,750 | B2 | * | 1/2005 | Matischuk et al. ..... 123/339.19 |

FOREIGN PATENT DOCUMENTS

JP 11-73206 3/1999

\* cited by examiner

*Primary Examiner*—Anthony Knight
*Assistant Examiner*—Thonas Pham
(74) *Attorney, Agent, or Firm*—Squire, Sanders & Dempsey L.L.P.

(57) ABSTRACT

A control system for a plant, having an identifier and a controller. The identifier identifies model parameters of a controlled object model which is obtained by modeling the plant. The controller calculates a control input to the plant so that an output from the plant coincides with a control target value, using the identified model parameters. The controller calculates a self-tuning control input, using the model parameters identified by the identifier. The controller further calculates a damping control input according to the rate of change in the output from the plant or the rate of change in a deviation between the output from the plant and the control target value. The controller calculates the control input to the plant as a sum of the self-tuning control input and the damping control input.

9 Claims, 15 Drawing Sheets

CONTROL SYSTEM FOR PLANT AND AIR-FUEL RATIO CONTROL SYSTEM FOR INTERNAL COMBUSTION ENGINE

CROSS REFERENCE TO RELATED APPLICATIONS

This is a Division of Application Ser. No. 10/207,258 filed on Jul. 30, 2002 now U.S. Pat. No. 6,814,067. The disclosure of the prior application is hereby incorporated by reference herein in its entirety.

BACKGROUND OF THE INVENTION

The present invention relates to a control system for a plant, which uses a self-tuning regulator, and also relates to an air-fuel ratio control system for controlling, to a target value, an air-fuel ratio of an air-fuel mixture to be supplied to an internal combustion engine.

An example of a control system for a plant, which uses a self-tuning regulator is described in Japanese Patent Laid-open No. 11-73206 . FIG. 15 is a block diagram showing a general configuration of a control system using a self-tuning regulator 104 as shown in this publication. The self-tuning regulator 104 includes a parameter adjusting mechanism 105 and an inverse transfer function controller 106. The parameter adjusting mechanism 105 identifies model parameters (which will be hereinafter referred to also as "self-tuning parameters") of a controlled object model obtained by modeling a controlled object (an engine system). The inverse transfer function controller 106 calculates a self-tuning correction coefficient KSTR by an inverse transfer function of a transfer function of the controlled object model by using the model parameters identified by the parameter adjusting mechanism 105. An air-fuel ratio detected by an air-fuel ratio sensor 17 is converted into a detected equivalent ratio KACT by a converting section 103, and the detected equivalent ratio KACT is supplied to the self-tuning regulator 104.

A target value calculating section 102 calculates a target air-fuel ratio coefficient KCMD (target equivalent ratio) corresponding to a target air-fuel ratio, and inputs the target air-fuel ratio coefficient KCMD into a fuel amount calculating section 101 and the inverse transfer function controller 106. The parameter adjusting mechanism 105 identifies the model parameters according to the detected equivalent ratio KACT and the self-tuning correction coefficient KSTR. The inverse transfer function controller 106 calculates a present value of the self-tuning correction coefficient KSTR according to the target equivalent ratio KCMD, the detected equivalent ratio KACT, and past values of the self-tuning correction coefficient KSTR. The self-tuning correction coefficient KSTR and the target equivalent ratio KCMD are input to the fuel amount calculating section 101. The fuel amount calculating section 101 calculates a fuel amount TOUT, that is, an amount of fuel to be supplied to an internal combustion engine (which will be hereinafter referred to also as "engine") 1, using the target air-fuel ratio coefficient KCMD, the self-tuning correction coefficient KSTR, and other correction coefficients.

More specifically, the engine system as a controlled object is modeled into a controlled object model (DARX model (delayed autoregressive model with exogenous input)) defined by Eq. (1) shown below:

$$KACT(k) = b0 \times KSTR(k-2) + r1 \times KSTR(k-3) + r2 \times KSTR(k-4) + r3 \times KSTR(k-5) + s0 \times KACT(k-2) \quad (1)$$

where b0, r1, r2, r3, and s0 are the model parameters identified by the parameter adjusting mechanism 105. When a model parameter vector $\theta(k)$ having the model parameters as elements is defined by Eq. (2), shown below, the model parameter vector $\theta(k)$ is calculated from Eq. (3) shown below:

$$\theta(k)^T = [b0, r1, r2, r3, s0] \quad (2)$$

$$\theta(k) = EPS\theta(k-1) + KP(k)\mathrm{ide}(k) \quad (3)$$

where KP(k) is a gain coefficient vector defined by Eq. (4) shown below, and ide(k) is an identification error defined by Eq. (5), shown below. Further, EPS is a forgetting coefficient vector defined by Eq. (6), shown below. In Eq. (6), $\epsilon$ is a forgetting coefficient which is set to a value between "0" and "1":

$$KP(k) = \frac{P\zeta(k)}{1 + \zeta^T(k)P\zeta(k)} \quad (4)$$

$$\mathrm{ide}(k) = KACT(k) - \theta(k-1)^T \zeta(k) \quad (5)$$

$$EPS = [1, \epsilon, \epsilon, \epsilon, \epsilon] \quad (6)$$

In Eq. (4), P is a square matrix wherein the diagonal elements are constants and all the other elements are "0". In Eqs. (4) and (5), $\zeta(k)$ is a vector defined by Eq. (7), shown below, and having a control output (KACT) and control inputs (KSTR) as elements.

$$\zeta(k)^T = [KSTR(k-2), KSTR(k-3), KSTR(k-4), KSTR(k-5), KACT(k-2)] \quad (7)$$

Further, the inverse transfer function controller 106 determines the control input KSTR(k) so that Eq. (8), shown below, holds:

$$KCMD(k) = KACT(k+2) \quad (8)$$

By applying Eq. (1) to Eq. (8), the right side of Eq. (8) becomes:

$$KACT(k+2) = b0 \times KSTR(k) + r1 \times KSTR(k-1) + r2 \times KSTR(k-2) + r3 \times KSTR(k-3) + s0 \times KACT(k) \quad (8a)$$

Accordingly, the following equation (9), shown below is obtained from Eqs. (8) and (8a). The control input KSTR(k) is calculated from Eq. (9):

$$KSTR(k) = (1/b0)[KCMD(k) - r1 \times KSTR(k-1) - r2 \times KSTR(k-2) - r3 \times KSTR(k-3) - s0 \times KACT(k)] \quad (9)$$

That is, the inverse transfer function controller 106 calculates the control input KSTR(k) so that a deviation e(k) between a future equivalent ratio KACT(k+2) which will be detected two control cycles later, and the present value KCMD(k) of the target equivalent ratio, becomes "0". The deviation e(k) is defined by Eq. (10), shown below:

$$e(k) = KACT(k+2) - KCMD(k) \quad (10)$$

The characteristic of the controlled object model defined by Eq. (1) does not completely coincide with the characteristic of the actual controlled object, but includes a modeling error (the difference between the characteristic of the controlled object model and the characteristic of the actual controlled object). Further, the parameter adjusting mechanism 105 adopts a fixed gain algorithm. Accordingly, when the target equivalent ratio KCMD changes stepwise as shown in FIG. 16, the detected equivalent ratio KACT is influenced by the identification behavior of the model parameters due to the modeling error and the fixed gain algorithm, which sometimes results in an overshoot of the detected equivalent ratio KACT with respect to the target equivalent ratio KCMD.

Such overshoot causes a reduction in the purification rate of a catalyst provided in an exhaust system of the engine. This results in a deterioration of exhaust characteristics. Furthermore, depending on engine operating conditions, there is a possibility of causing an engine output surge wherein the engine driving force fluctuates.

SUMMARY OF THE INVENTION

Accordingly, it is an object of the present invention to provide a control system for a plant, wherein a plant such as the above-described engine system is properly controlled, using a self-tuning regulator. As a result, an output from the plant accurately coincides with a control target value even when the control target value changes stepwise.

It is another object of the present invention to provide an air-fuel ratio control system for an internal combustion engine which can properly control the air-fuel ratio of an air-fuel mixture to be supplied to the engine. As a result, the actual air-fuel ratio detected in an exhaust system of the engine accurately coincides with a target value even when the target value changes stepwise, thereby preventing a deterioration in the exhaust characteristic and the engine output surge.

To attain the first object, the present invention provides a control system for a plant, including identifying means (54) and control means (55). The identifying means (54) identifies model parameters (b0, r1, r2, r3, s0) of a controlled object model obtained by modeling the plant. The control means (55) calculates a control input (KSTR) to the plant so that an output (KACT) from the plant coincides with a control target value (KCMD), using the model parameters (b0, r1, r2, r3, s0) identified by the identifying means (54). The control means (55) includes self-tuning control input calculating means and damping control input calculating means. The self-tuning control input calculating means calculates a self-tuning control input (KSTRADP), using the model parameters (b0, r1, r2, r3, s0) identified by the identifying means (54). The damping control input calculating means calculates a damping control input (KSTRDMP) according to a rate of change in the output (KACT) from the plant, or a rate of change in a deviation (e) between the output (KACT) from the plant and the control target value (KCMD). The control input (KSTR) to the plant is calculated as the sum of the self-tuning control input (KSTRADP) and the damping control input (KSTRDMP).

With this configuration, the self-tuning control input is calculated using the model parameters identified by the identifying means, and the damping control input is calculated according to the rate of change of the output from the plant, or the rate of change of the deviation between the output from the plant and the control target value. Then, the control input to the plant is calculated as the sum of the self-tuning control input and the damping control input. Accordingly, the overshoot of the output from the plant with respect to the control target value can be prevented, and the follow-up characteristic to the control target value can be improved. The "follow-up characteristic" means a performance of a controller, with respect to the state in which the output from the plant follows up the control target value.

Preferably, the self-tuning control input calculating means calculates the self-tuning control input so that a response characteristic of the deviation between the output from the plant and the control target value becomes a specified characteristic.

With this configuration, the self-tuning control input is calculated so that the response characteristic of the deviation between the output from the plant and the control target value becomes a specified characteristic. As compared to the case where the response characteristic is not controlled to become a specified characteristic, the damping gain of the damping control input can be enlarged to thereby obtain a greater effect of reducing the overshoot.

The present invention provides another control system for a plant, including identifying means (54) and self-tuning control input calculating means (55). The identifying means (54) identifies model parameters (b0, r1, r2, r3, s0) of a controlled object model which is obtained by modeling the plant. The self-tuning control input calculating means (55) calculates a self-tuning control input (KSTRADP) to the plant, using the model parameters (b0, r1, r2, r3, s0) identified by the identifying means (54), so that an output (KACT) from the plant coincides with a control target value (KCMD). In addition, the self-tuning control input calculating means (55) calculates the self-tuning control input (KSTRADP) so that a response characteristic of a deviation (e) between the output (KACT) from the plant and the control target value (KCMD) becomes a specified characteristic.

With this configuration, the self-tuning control input to the plant is calculated by the self-tuning regulator using the model parameters identified by the identifying means so that the response characteristic of the deviation between the output from the plant and the control target value becomes a specified characteristic. When the rate of change of the control target value is large in the self-tuning regulator, there is a tendency for the identification behavior of the model parameters to have an effect on the control input, causing an overshoot of the output from the plant with respect to the control target value. By calculating the self-tuning control input to the plant so that the response characteristic of the deviation between the output from the plant and the control target value becomes a specified characteristic, the overshoot of the output from the plant can be reduced, when the rate of change in the control target value is large.

To attain the second object, the present invention provides an air-fuel ratio control system for an internal combustion engine, including identifying means (54), an air-fuel ratio sensor (17) provided in an exhaust system of the engine, and control means (55). The identifying means (54) identifies model parameters (b0, r1, r2, r3, s0) of a controlled object model which is obtained by modeling the engine. The control means (55) controls the air-fuel ratio of an air-fuel mixture to be supplied to the engine so that the air-fuel ratio (KACT) detected by the air-fuel ratio sensor coincides with a target value (KCMD). The control means (55) includes self-tuning control input calculating means and damping control input calculating means. The self-tuning control input calculating means calculates a self-tuning control input (KSTRADP), using the model parameters (b0, r1, r2, r3, s0) identified by the identifying means. The damping control input calculating means calculates a damping control input (KSTRDMP) according to the rate of change in the detected air-fuel ratio (KACT) or the rate of change in a deviation (e) between the detected air-fuel ratio (KACT) and the target value (KCMD). The air-fuel ratio of the air-fuel mixture to be supplied to the engine is controlled using the self-tuning control input (KSTRADP) and the damping control input (KSTRDMP).

With this configuration, the self-tuning control input is calculated using the model parameters identified by the identifying means, and the damping control input is calculated according to the rate of change of the air-fuel ratio detected by the air-fuel ratio sensor or the rate of change of the deviation between the detected air-fuel ratio and the target value. The air-fuel ratio of the air-fuel mixture to be supplied to the engine is controlled using the self-tuning control input and the damping control input calculated above. Accordingly, the overshoot of the detected air-fuel ratio with respect to the control target value can be suppressed, and the follow-up characteristic to the control target value can be improved.

The present invention provides another air-fuel ratio control system for an internal combustion engine, including an air-fuel ratio sensor (17) provided in an exhaust system of the engine and air-fuel ratio control means (42). The air-fuel ratio control means (42) controls the air-fuel ratio of an air-fuel mixture to be supplied to the engine so that the air-fuel ratio (KACT) detected by the air-fuel ratio sensor coincides with a target value (KCMD). The air-fuel ratio control means (42) includes response specifying control term calculating means for calculating a response specifying control term (KSTRADP) so that the response characteristic of a deviation (e) between the detected air-fuel ratio (KACT) and the target value (KCMD) becomes a specified characteristic. The air-fuel ratio of the air-fuel mixture to be supplied to the engine is controlled using the response specifying control term (KSTRADP).

With this configuration, the response specifying control term is calculated so that the response characteristic of the deviation between the detected air-fuel ratio and the target value, becomes a specified characteristic, and the air-fuel ratio of the air-fuel mixture to be supplied to the engine is controlled using the response specifying control term calculated above. Accordingly, the overshoot of the detected air-fuel ratio with respect to the target value can be suppressed, thereby improving the purification rate of the catalyst and suppressing fluctuations in output from the engine. As a result, the exhaust characteristic can be improved and the engine output surge can be suppressed.

Preferably, the air-fuel ratio control means (42) further includes identifying means (54) for identifying model parameters (b0, r1, r2, r3, s0) of a controlled object model which is obtained by modeling the engine. The response specifying control term calculating means calculates the response specifying control term (KSTRADP) using the model parameters (b0, r1, r2, r3, s0) identified by the identifying means (54).

With this configuration, the model parameters of the controlled object model which is obtained by modeling the engine are identified, and the response specifying control term is calculated using the model parameters identified above. Accordingly, the model parameters reflect an operating condition of the engine and aging in characteristics of the engine, and an optimum value of the response specifying control term can be obtained irrespective of operating conditions of the engine and the aging in characteristics of the engine. As a result, a good follow-up characteristic of the air-fuel ratio to the target value can be maintained.

Preferably, the air-fuel ratio control means (42) further includes damping control term calculating means for calculating a damping control term (KSTRDMP) according to the rate of change in the detected air-fuel ratio (KACT) or the rate of change in the deviation between the detected air-fuel ratio and the target value. The air-fuel ratio of the air-fuel mixture to be supplied to the engine is controlled using the response specifying control term (KSTRADP) and the damping control term (KSTRDMP).

With this configuration, the damping control term is calculated according to the rate of change in the detected air-fuel ratio, or the rate of change in the deviation between the detected air-fuel ratio and the target value. Further, the air-fuel ratio of the air-fuel mixture to be supplied to the engine is controlled using the response specifying control term and the damping control term calculated above. Accordingly, the overshoot of the detected air-fuel ratio with respect to the target value can be further reduced.

Preferably, the damping control term calculating means calculates the damping control term (KSTRDMP) using a damping coefficient (KDAMP, KDAMP'), and sets the damping coefficient (KDAMP, KDAMP') according to an operating condition of the engine.

With this configuration, the damping control term is calculated by using the damping coefficient, and the damping coefficient is set according to an operating condition of the engine. Accordingly, by setting the damping coefficient to a small value in an engine operating condition where the overshoot is unlikely to occur, the follow-up characteristic to the target value can be improved. On the other hand, by setting the damping coefficient to a large value in an engine operating condition where the overshoot is prone to occur, the overshoot can be reliably suppressed. As a result, a good exhaust characteristic can be obtained over a wide range of engine operating conditions.

Preferably, the response specifying control term calculating means changes the response characteristic by using a response specifying parameter (POLE), and sets the response specifying parameter (POLE) according to an operating condition of the engine.

With this configuration, the response characteristic is changed according to the response specifying parameter, and the response specifying parameter is set according to an operating condition of the engine. Accordingly, by increasing the response speed in an engine operating condition where the overshoot is unlikely to occur, the follow-up characteristic to the target value can be improved. On the other hand, by decreasing the response speed in an engine operating condition where the overshoot is prone to occur, the overshoot can be reliably suppressed. As a result, a good exhaust characteristic can be obtained over a wide range of engine operating conditions.

DETAILED DESCRIPTION OF THE INVENTION

Some embodiments of the present invention will now be described with reference to the drawings.

First Embodiment

Figure 1:
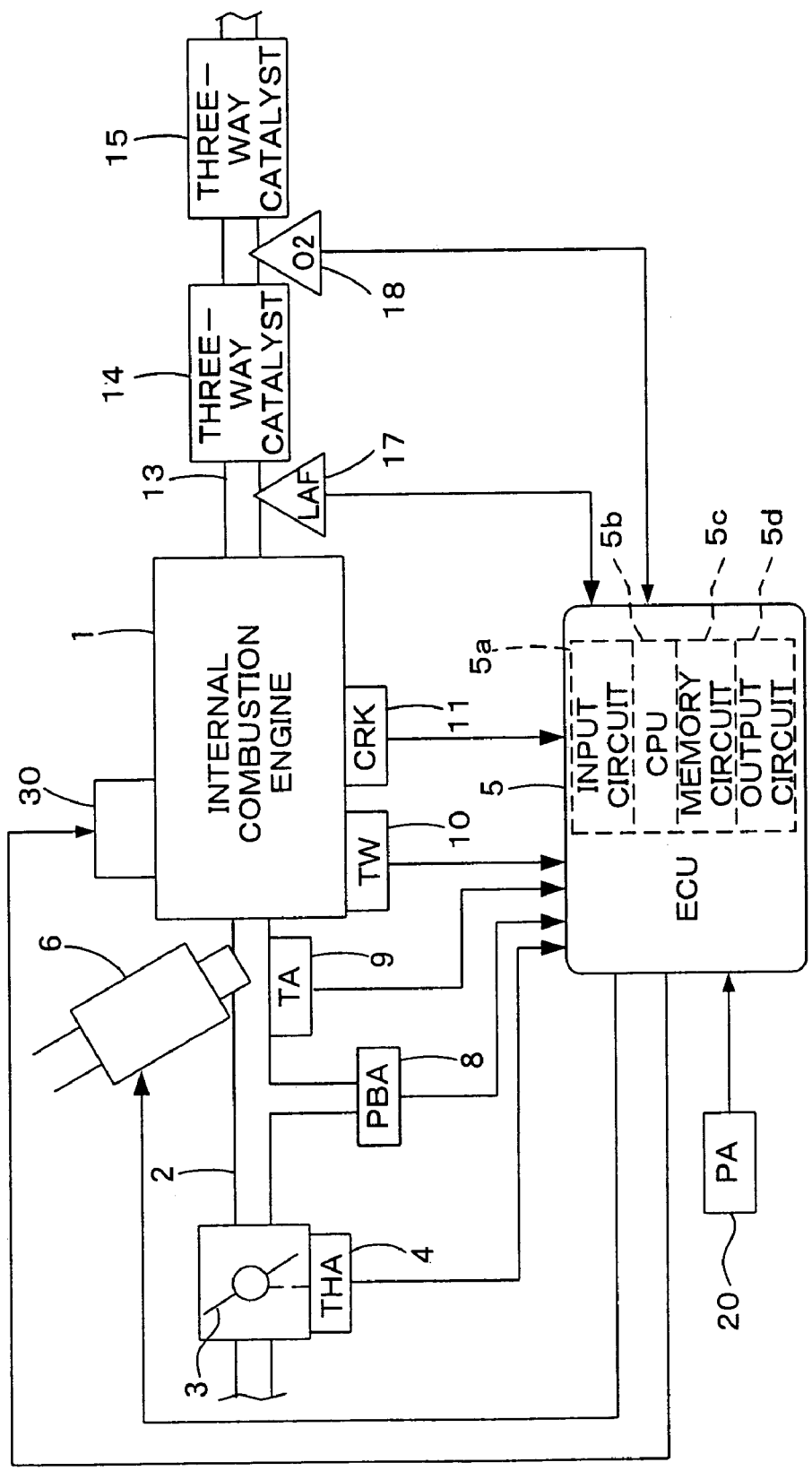
FIG. 1 is a block diagram showing the configuration of an internal combustion engine and a control system therefor according to a first embodiment of the present invention.

FIG. 1 is a block diagram showing the configuration of a control system for a plant, such as, an air-fuel ratio control system for an internal combustion engine (which will be hereinafter referred to as "engine") according to a first embodiment of the present invention.

The engine can be a six-cylinder engine 1, having an intake pipe 2 provided with a throttle valve 3. A throttle opening (THA) sensor 4 is connected to the throttle valve 3, so as to output an electrical signal corresponding to a throttle valve opening THA of the throttle valve 3, and supply the electrical signal to an electronic control unit (which will be hereinafter referred to as "ECU") 5.

A fuel injection valve 6 is inserted into the intake pipe 2 at a position between the engine 1 and the throttle valve 3 and slightly upstream of an intake valve (not shown) of each cylinder. That is, six fuel injection valves 6 can be respectively provided for the six cylinders of the engine 1. These fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 8 is provided immediately downstream of the throttle valve 3. An absolute pressure signal converted to an electrical signal by the absolute intake pressure sensor 8 is supplied to the ECU 5. An intake air temperature (TA) sensor 9 is provided downstream of the absolute intake pressure sensor 8 to detect an intake air temperature TA. An electrical signal corresponding to the detected intake air temperature TA is output from the sensor 9 and supplied to the ECU 5.

An engine coolant temperature (TW) sensor 10 such as a thermistor is mounted on the body of the engine 1 to detect an engine coolant temperature (cooling water temperature) TW. A temperature signal corresponding to the detected engine coolant temperature TW is output from the engine coolant temperature sensor 10 and supplied to the ECU 5.

A crank angle position sensor 11 for detecting a rotational angle of a crankshaft (not shown) of the engine 1 is connected to the ECU 5, and a signal corresponding to the detected rotational angle of the crankshaft is supplied to the ECU 5. The crank angle position sensor 11 includes a cylinder discrimination sensor to output a signal pulse at a predetermined crank angle position for a specific cylinder of the engine 1 (this signal pulse will be hereinafter referred to as a "CYL signal pulse"). The crank angle position sensor 11 also includes a top dead center (TDC) sensor to output a TDC signal pulse at a crank angle position before TDC by a predetermined crank angle starting at an intake stroke in each cylinder (at every 120 deg crank angle in the case of a six-cylinder engine), and a CRK sensor for generating one pulse with a constant crank angle period (e.g., a period of 30 deg) shorter than the period of generation of the TDC signal pulse (this pulse will be hereinafter referred to as "CRK signal pulse"). The CYL signal pulse, the TDC signal pulse, and the CRK signal pulse are supplied to the ECU 5. These signal pulses are used to control the various timings, such as fuel injection timing and ignition timing, and for detection of an engine rotational speed NE.

The engine 1 is provided with an exhaust pipe 13. The exhaust pipe 13 can be provided with an air-fuel ratio sensor (which will be hereinafter referred to as "LAF sensor") 17, for example, to output an electrical signal substantially proportional to the oxygen concentration in exhaust gases (the air-fuel ratio of an air-fuel mixture supplied to the engine 1). A first three-way catalyst 14 is provided downstream of the LAF sensor 17, and a second three-way catalyst 15 is provided downstream of the first three-way catalyst 14. Further, an oxygen concentration sensor (which will be hereinafter referred to as "O2 sensor") 18 is interposed between the first three-way catalyst 14 and the second three-way catalyst 15. These three-way catalysts 14 and 15 reduce HC, CO, and NOx contained in the exhaust gases.

The LAF sensor 17 is connected to the ECU 5 to provide the ECU 5 with an electrical signal substantially proportional to the oxygen concentration in the exhaust gases. The O2 sensor 18 has a characteristic such that its output rapidly changes in the vicinity of a stoichiometric ratio. That is, the output from the O2 sensor 18 has a high level in a rich region with respect to the stoichiometric ratio, and has a low level in a lean region with respect to the stoichiometric ratio. The O2 sensor 18 is also connected to the ECU 5 to supply a detection signal to the ECU 5.

The engine 1 has a valve timing switching mechanism 30 capable of switching the valve timing of intake valves and exhaust valves between a high-speed valve timing suitable for a high-speed rotational region of the engine 1, and a low-speed valve timing suitable for a low-speed rotational region of the engine 1. This switching of the valve timing also includes switching of a valve lift amount. Further, when selecting the low-speed valve timing, one of the two intake valves in each cylinder is stopped to ensure stable combustion even in the case of setting the air-fuel ratio lean with respect to the stoichiometric ratio.

The valve timing switching mechanism 30 is of a type that the switching of the valve timing is carried out hydraulically. That is, a solenoid valve for performing the hydraulic switching and an oil pressure sensor are connected to the ECU 5. A detection signal from the oil pressure sensor is supplied to the ECU 5, and the ECU 5 controls the solenoid valve to perform the switching control of the valve timing according to an operating condition of the engine 1.

An atmospheric pressure sensor 20 for detecting an atmospheric pressure (PA) can be connected to the ECU 5, for example, to supply a detection signal to the ECU 5.

Although not shown, an exhaust recirculation mechanism and an evaporative fuel processing device are provided. The exhaust recirculation mechanism recirculates exhaust gases to the intake pipe 2. The evaporative fuel processing device has a canister for storing an evaporative fuel generated in a fuel tank to supply the evaporative fuel to the intake pipe 2 at an appropriate time.

The ECU 5 includes an input circuit 5a having various functions such as a function of shaping the waveforms of input signals from the various sensors, a function of correcting the voltage levels of the input signals to a predetermined level, and a function of converting analog signal values into digital signal values. The ECU further includes a central processing unit (which will be hereinafter referred to as "CPU") 5b, a memory circuit 5c, and an output circuit 5d. The memory circuit includes a ROM preliminarily storing various operational programs to be executed by the CPU 5b and also storing various maps, and a RAM for storing the results of computation or the like by the CPU 5b. The output circuit 5d supplies drive signals to various solenoid valves including the fuel injection valves 6 and the spark plugs (not shown) of the engine 1.

The ECU 5 determines various engine operating regions such as a feedback control operating region and an open loop control operating region, based on various engine operation parameter signals as mentioned above. In the feedback control operating region, a feedback air-fuel ratio control can be performed according to the outputs from the LAF sensor 17 and the O2 sensor 18. The ECU 5 calculates a required fuel amount (TCYL) from Eq. (11) shown below. The required fuel amount TCYL is a fuel amount required for a combustion per cycle in each cylinder:

$$TCYL = TIMF \times KTOTAL \times KCMDM \times KFB \quad (11)$$

where TIMF is a basic fuel amount;
KTOTAL is a correction coefficient;
KCMDM is a final target air-fuel ratio coefficient; and
KFB is a feedback correction coefficient.

The ECU 5 further executes an adhesion correcting operation which takes into account that the fuel injected from each fuel injection valve 6 into the intake pipe partially adheres to the inner wall of the intake pipe, to calculate a fuel injection period TOUT of each fuel injection valve 6. The adhesion correction is disclosed in detail, for example, in Japanese Patent Laid-open No. 8-21273.

Figure 2:
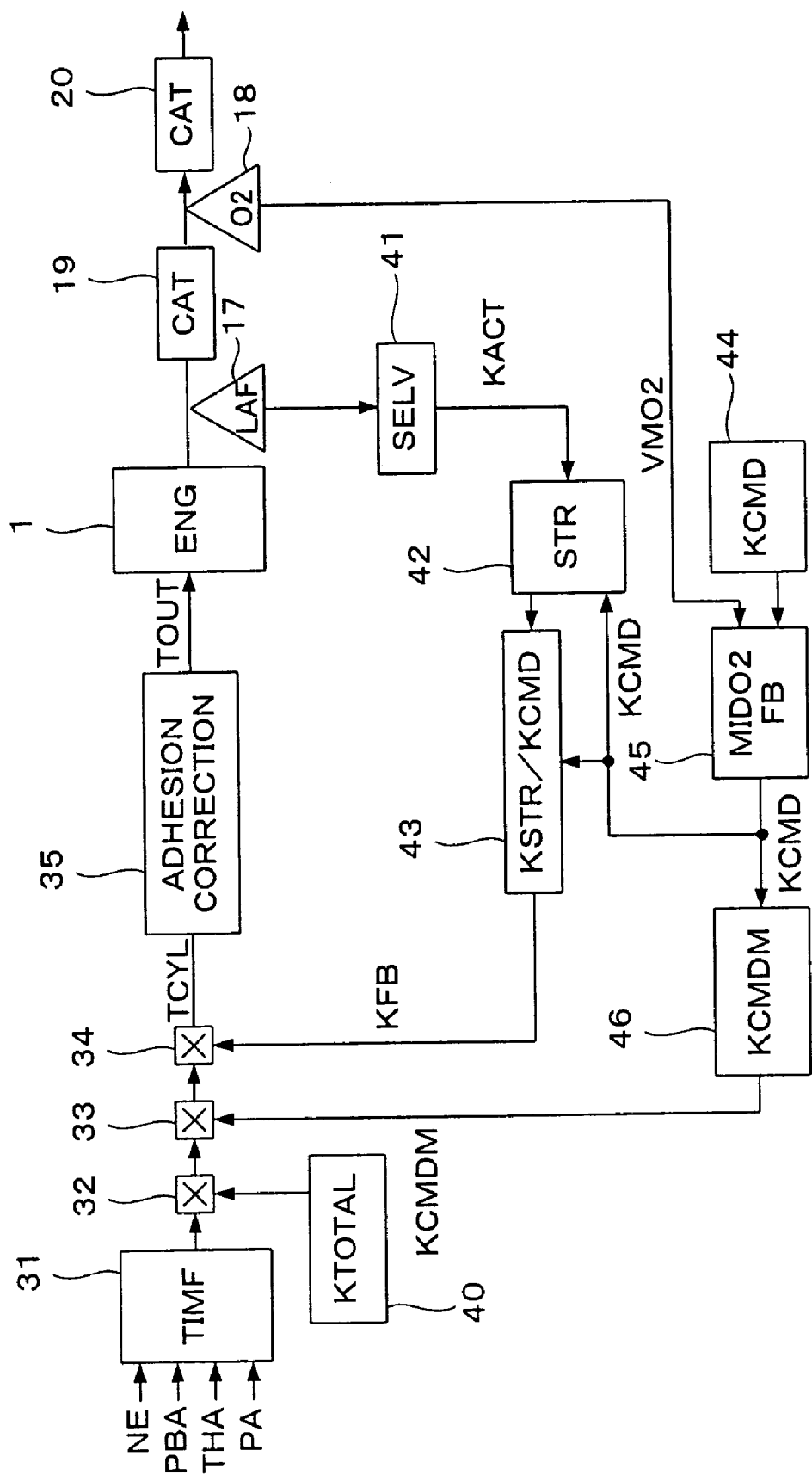
FIG. 2 is a block diagram for illustrating a method of calculating a fuel amount (TOUT)

FIG. 2 is a functional block diagram for illustrating the calculation of the required fuel amount TCYL from Eq. (11) and a method of calculating the fuel injection period TOUT. The outline of this calculating method for the fuel injection period TOUT in this embodiment will now be described with reference to FIG. 2. The amount of fuel to be supplied to the engine is calculated as the fuel injection period of each fuel injection valve 6 in this embodiment. This fuel supply amount corresponds to the amount of fuel to be injected. Therefore, TCYL and TOUT are referred to also as "fuel injection amount" or "fuel amount".

Referring to FIG. 2, a TIMF block 31 calculates a basic fuel amount TIMF corresponding to an intake air amount. The basic fuel amount TIMF is basically set according to the engine rotational speed NE and the absolute intake pressure PBA. It is preferable to model an intake system ranging from the throttle valve 3 to the combustion chambers of the engine 1, and to execute correction according to a delay of the intake air based on this intake system model. In this case, the throttle valve opening THA and the atmospheric pressure PA are further used as detection parameters for calculating the basic fuel amount TIMF.

Each of multiplying blocks 32, 33, and 34 multiplies input parameters to output a product. Then, the calculation of Eq. (11) is executed by these multiplying blocks 32 to 34 to obtain the required fuel amount TCYL. An adhesion correction block 35 performs the adhesion correcting operation for the required fuel amount TCYL to calculate the fuel injection amount TOUT.

A KTOTAL block 40 calculates a correction coefficient KTOTAL by multiplying all feed-forward correction coefficients including an engine coolant temperature correction coefficient KTW which is set according to the engine coolant temperature TW, an EGR correction coefficient KEGR which is set according to an exhaust gas recirculation amount during execution of exhaust gas recirculation, and a purge correction coefficient KPUG which is set according to a purge fuel amount upon execution of purging by the evaporative fuel processing device. The correction coefficient KTOTAL thus calculated is input to the multiplying block 32.

A KCMD block 44 decides a target air-fuel ratio coefficient KCMD according to the engine rotational speed NE, and the absolute intake pressure PBA, etc. The target air-fuel ratio coefficient KCMD thus decided is input to a MIDO2FB block 45. The target air-fuel ratio coefficient KCMD is proportional to the reciprocal of an air-fuel ratio A/F, i.e., proportional to a fuel-air ratio F/A, and takes a value of "1.0" for the stoichiometric ratio. Therefore, KCMD is referred to also as a target equivalent ratio. The MIDO2FB block 45 corrects the target air-fuel ratio coefficient KCMD according to an O2 sensor output VMO2. The target air-fuel ratio coefficient KCMD thus corrected is input to an STR block 42, a division block 43, and a KCMDM block 46. The KCMDM block 46 performs fuel cooling correction according to the corrected target air-fuel ratio coefficient KCMD output from the MIDO2FB block 45 to calculate a final target air-fuel ratio coefficient KCMDM. The final target air-fuel ratio coefficient KCMDM thus calculated is input to the multiplying block 33.

A SELV block 41 samples a LAF sensor output value every time the CRK signal pulse is generated, sequentially stores the sampled value into a ring buffer memory, and selects the value which is sampled at an optimum timing, according to the engine operating condition. That is, the SELV block 41 executes a LAF sensor output selection process. The SELV block 41 further converts the selected sampled value into a detected equivalent ratio KACT. The detected equivalent ratio KACT thus converted is input to the STR block 42. This LAF sensor output selection process is performed because of the following facts: 1) the ever-changing air-fuel ratio cannot be accurately detected depending on the sampling timing, and 2) the time period during which the exhaust gases move from the combustion chamber to the LAF sensor 17 and the response time period of the LAF sensor 17, vary according to the engine operating condition.

The STR block 42 calculates a self-tuning correction coefficient KSTR by a self-tuning regulator according to the detected equivalent ratio KACT. The self-tuning correction coefficient KSTR thus calculated is input to the division block 43. If the target air-fuel ratio coefficient KCMD (KCMDM) is only multiplied by the basic fuel amount TIMF, the actual air-fuel ratio becomes an averaged target air-fuel ratio due to a response delay of the engine. Therefore, the self-tuning regulator is employed to dynamically compensate for the response delay of the engine and improve the robustness of the control against disturbance.

The division block 43 calculates a feedback correction coefficient KFB (=KSTR/KCMD) by dividing the self-tuning correction coefficient KSTR by the target air-fuel ratio coefficient KCMD. The feedback correction coefficient KFB thus calculated is input to the multiplying block 34. The self-tuning correction coefficient KSTR is calculated so that the detected equivalent ratio KACT coincides with the target air-fuel ratio coefficient KCMD. Accordingly, the self-tuning correction coefficient KSTR includes an element corresponding to the target air-fuel ratio coefficient KCMD. Therefore, the correction coefficient KSTR is divided by the target air-fuel ration coefficient KCMD so that the element corresponding to the target air-fuel ratio coefficient KCMD may not be repeatedly multiplied by the basic fuel amount TIMF.

Thus, the feedback correction coefficient KFB obtained by dividing the self-tuning correction coefficient KSTR calculated by the self-tuning regulator, by the target air-fuel ratio coefficient KCMD, is applied to Eq. (11) to calculate the required fuel amount TCYL. Further, the adhesion correction is performed for the required fuel amount TCYL, to calculate the fuel injection amount TOUT. By adopting the self-tuning correction coefficient KSTR, the follow-up characteristic regarding changes in the detected air-fuel ratio and the robustness against disturbance can be improved. Accordingly, the purification rate of each three-way catalyst can be improved, thereby obtaining good exhaust characteristics in various engine operating conditions.

Figure 3:
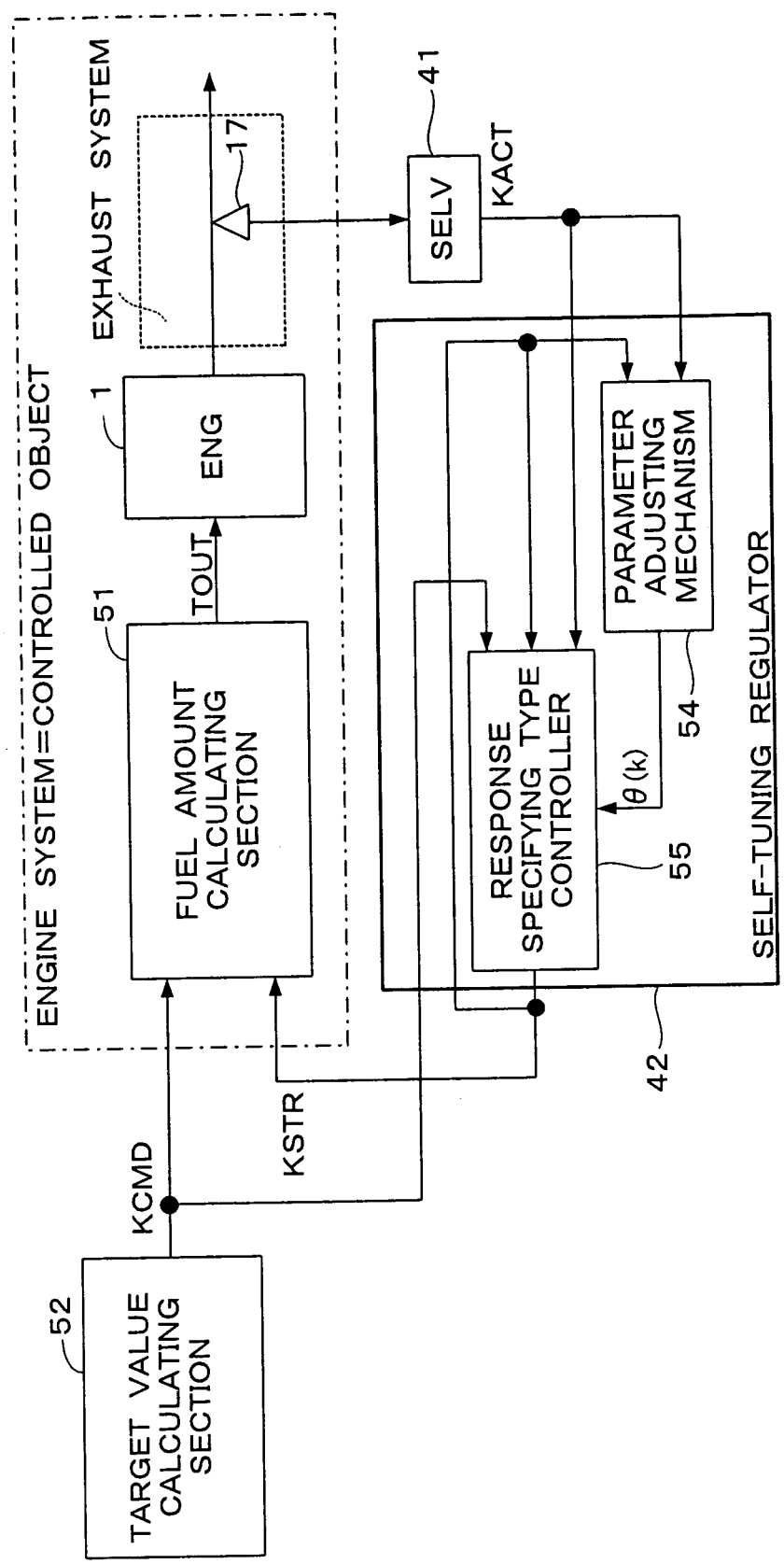
FIG. 3 is a block diagram modified from the block diagram of FIG. 2, mainly showing a self-tuning regulator.

FIG. 3 is a block diagram obtained by modifying the block diagram of FIG. 2. In FIG. 3, the STR block (which will be hereinafter referred to as "self-tuning regulator") 42 and the other parts are separately shown. That is, the KCMD block 44 and the MIDO2FB block 45 shown in FIG. 2 correspond to a target value calculating section 52, and the blocks 31 to 35, 40, 43, and 46 shown in FIG. 2 correspond to a fuel amount calculating section 51. When illustrating the control system by focusing the self-tuning regulator 42, the fuel amount calculating section 51 and the engine 1 correspond to a controlled object (plant). Accordingly, the self-tuning correction coefficient KSTR corresponds to a control input, and the detected equivalent ratio KACT corresponds to a control output.

Figure 15:
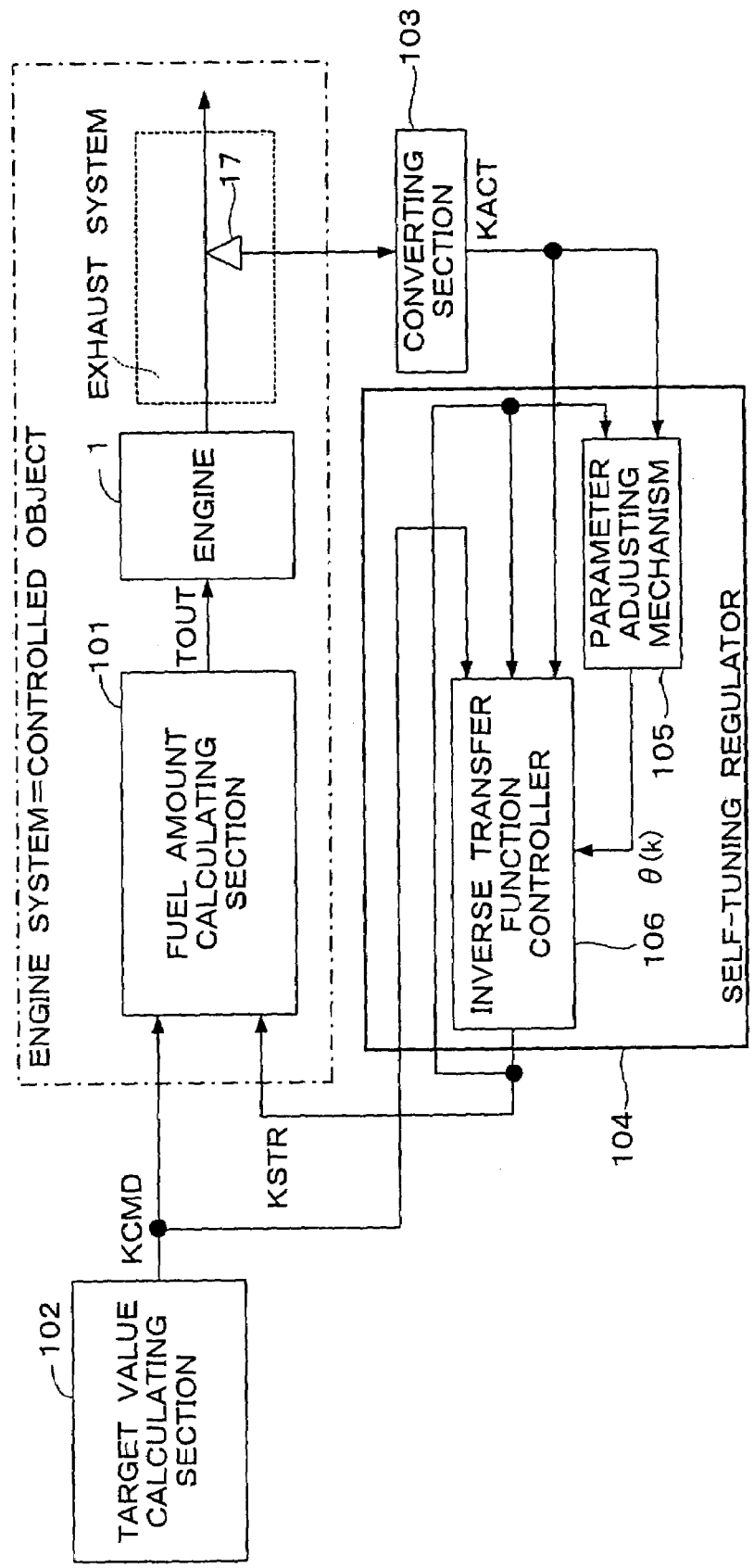
FIG. 15 is a block diagram showing the configuration of a control system in the prior art.
Figure 16:
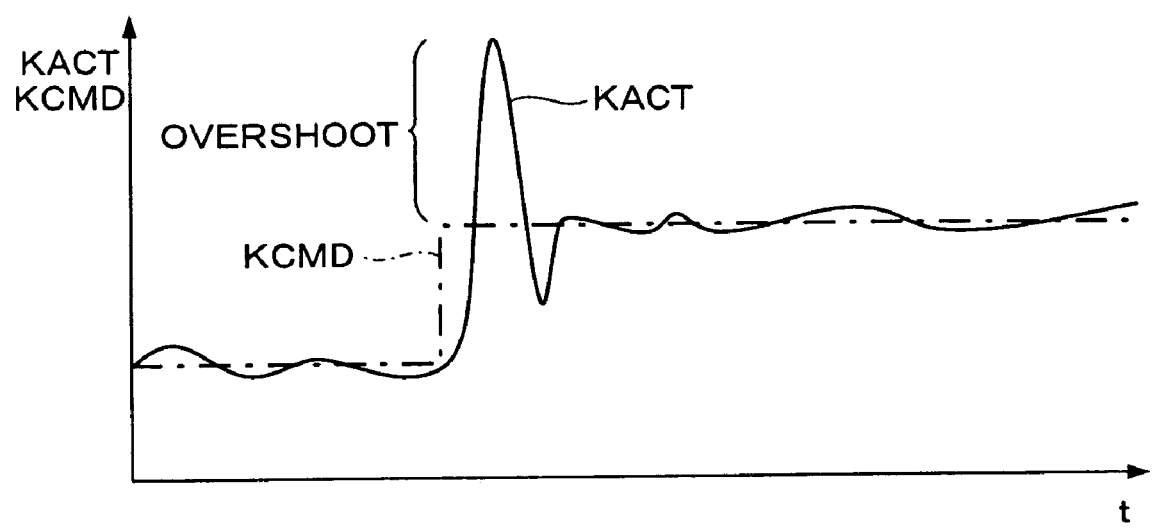
FIG. 16 is a graph for illustrating a control response characteristic by the control system shown in FIG. 15.

In this embodiment, the self-tuning regulator 42 includes of a parameter adjusting mechanism 54 and a response specifying type controller 55. As compared with the conventional self-tuning regulator 104 shown in FIG. 15, the response specifying type controller 55 is employed in place of the inverse transfer function controller 106. The parameter adjusting mechanism 54 is substantially the same as the conventional parameter adjusting mechanism 105. A model parameter vector θ (k) is calculated from Eqs. (2) to (6) mentioned previously. The model parameter vector θ (k) is also referred to as self-tuning parameter vector θ (k).

The response specifying type controller 55 will now be described in detail.

As mentioned above, in the prior art, the control input KSTR(k) is calculated so that the deviation e(k) defined by Eq. (10) shown below becomes "0":

$$e(k) = KACT(k+2) - KCMD(k) \tag{10}$$

Conversely, in this embodiment, a deviation function σ (k) is defined by Eq. (12), shown below, and a control input KSTR(k) is calculated so that the deviation function σ (k) becomes "0":

$$\sigma(k) = e(k) + POLE \times e(k-1) \tag{12}$$

where POLE is a response specifying parameter for specifying a response characteristic, and this parameter is set to a value which is greater than "−1" and less than or equal to "0". If the response specifying parameter POLE is set to a value which is greater than "0" and less than "1", the output response becomes oscillatory. Therefore, such a value is not used herein.

When the deviation function σ (k) is "0", Eqs. (13) and (14), shown below, are obtained from Eq. (12):

$$e(k) + POLE \times e(k-1) = 0 \tag{13}$$

$$e(k) = -POLE \times e(k-1) \tag{14}$$

Figure 4:
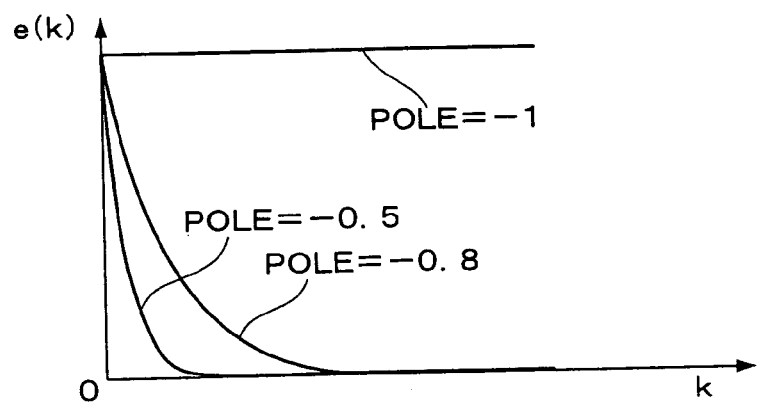
FIG. 4 is a graph showing the relation between values of a response specifying parameter (POLE) and response characteristics of a control deviation (e(k))

Eq. (14) expresses a first-order lag system with no input. The relation between values of the response specifying parameter POLE and changes of the deviation e(k) is shown in FIG. 4. That is, the damping speed of the deviation e(k) changes depending on the value of the response specifying parameter POLE. Accordingly, the damping characteristic of the deviation e(k) according to the value of the response specifying parameter POLE can be obtained, as shown in FIG. 4, by providing the control input KSTR(k) satisfying Eq. (14). In other words, by setting the response specifying parameter POLE to a specific value, the damping characteristic (response characteristic) of the deviation e(k) can be specified.

The control input KSTR(k) satisfying Eq. (14) can be obtained as follows:

The relation of Eq. (10) is applied to Eq. (13) to obtain Eq. (15), shown below. Furthermore, the relation of Eq. (1) is applied to Eq. (15) to obtain Eq. (16), shown below:

$$\begin{aligned}&KACT(k+2) - KCMD(k) + \\ &POLE \times [KACT(k+1) - KCMD(k-1)] = 0\end{aligned} \tag{15}$$

$$\begin{aligned}&b0 \times KSTR(k) + r1 \times KSTR(k-1) + r2 \times KSTR(k-2) + \\ &r3 \times KSTR(k-3) + s0 \times KACT(k) - KCMD(k) + \\ &POLE \times [b0 \times KSTR(k-1) + r1 \times KSTR(k-2) + \\ &r2 \times KSTR(k-3) + r3 \times KSTR(k-4) + s0 \times KACT(k-1) - \\ &KCMD(k-1)] = 0\end{aligned} \tag{16}$$

KSTR(k) is obtained from Eq. (16) to give Eq. (17) shown below.

$$\begin{aligned}KSTR(k) = (1/b0)\{&KCMD(k) + POLE \times KCMD(k-1) - \\ &(r1 + POLE \times b0)KSTR(k-1) - \\ &(r2 + POLE \times r1)KSTR(k-2) - \\ &(r3 + POLE \times r2)KSTR(k-3) - \\ &r3 \times KSTR(k-4) - \\ &s0[KACT(k) - POLE \times KACT(k-1)]\}\end{aligned} \tag{17}$$

Figure 5:
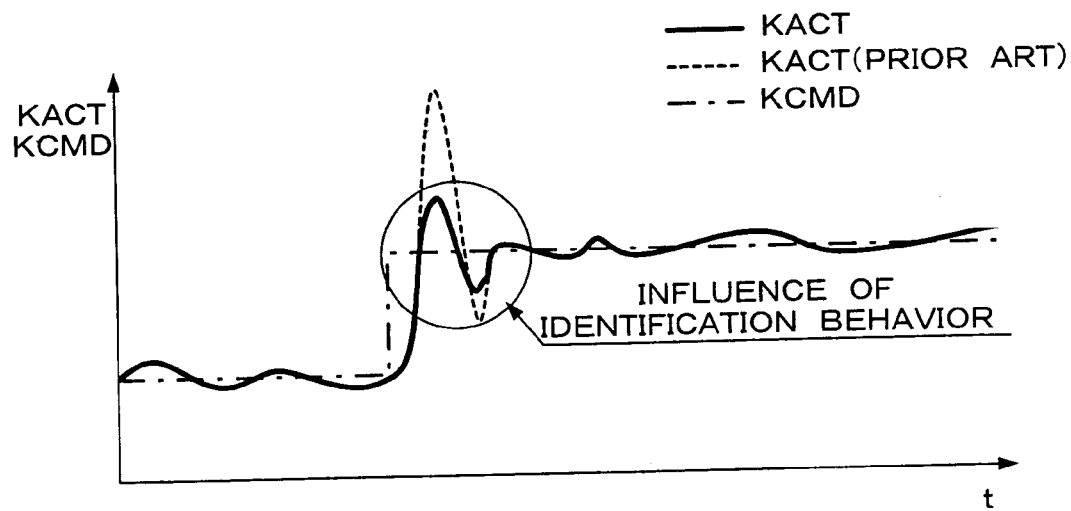
FIG. 5 is a graph showing the response characteristic of a detected equivalent ratio (KACT) in the case of a stepwise change in a target equivalent ratio (KCMD)

The feedback correction coefficient KFB is obtained by dividing the control input (self-tuning correction coefficient) KSTR(k) calculated from Eq. (17) by the target equivalent ratio KCMD(k). When applying the feedback correction coefficient KFB to Eq. (11), and performing the control of the amount of fuel to be supplied to the engine, a response characteristic, as shown by the solid line in FIG. 5, is obtained. In FIG. 5, the broken line and the alternate long and short dash line correspond respectively to a conventional response characteristic and the target equivalent ratio KCMD.

The controller for calculating the control input from Eq. (17) is a response specifying type controller. The response specifying type controller is capable of specifying the damping characteristic of the deviation e(k) with the response specifying parameter POLE, rather than an inverse transfer function controller as in the prior art. Accordingly, by setting the response specifying parameter POLE, the overshoot of the detected equivalent ratio KACT with respect to the target equivalent ratio KCMD can be greatly reduced.

However, the overshoot is not eliminated in spite of the use of the control input calculated from Eq. (17). That is, the specified response characteristic is not actually obtained. This may be due to the influence of the identification behavior of the model parameters using a fixed gain algorithm as the identification algorithm for the model parameters.

Accordingly, a damping control input is added, as defined by Eq. (18) or (19), shown below:

$$KSTRDMP'(k)=-KDAMP'\times[e(k)-e(k-1)] \qquad (18)$$

$$KSTRDMP(k)=-KDAMP\times[KACT(k)-KACT(k-1)] \qquad (19)$$

where KDAMP and KDAMP' are damping gains.

Eq. (18) is used to calculate a damping control input KSTRDMP' according to the rate of change in the deviation e(k), and Eq. (19) is used to calculate a damping control input KSTRDMP according to the rate in change of the detected equivalent ratio KACT(k). The absolute value of the damping control input KSTRDMP' calculated from Eq. (18) increases (the damping effect increase) not only when the rate of change of the detected equivalent ratio KACT becomes large, but also when the rate of change of the target equivalent ratio KCMD becomes large. Accordingly, the follow-up characteristic of the detected equivalent ratio KACT to the target equivalent ratio KCMD may be degraded. On the other hand, the absolute value of the damping control input KSTRDMP calculated from Eq. (19) increases only when the rate of change in the detected equivalent ratio KACT becomes so large that the overshoot may occur. Accordingly, it is possible to obtain both the effect of suppressing the overshoot and a good follow-up characteristic of the detected equivalent ratio KACT to the target equivalent ratio KCMD.

Therefore, in this embodiment, the damping control input KSTRDMP defined by Eq. (19) is employed. The control input calculated from Eq. (17) is replaced by a self-tuning control input KSTRADP(k) (see Eq. (17a) shown below), and the control input KSTR(k) of the engine system shown in FIG. 3 is calculated as a sum of the self-tuning control input KSTRADP and the damping control input KSTRDMP from Eq. (20), shown below:

$$KSTR(k) = KSTRADP(k) + KSTRDMP(k) \qquad (20)$$

$$\begin{aligned} KSTRADP(k) = (1/b0)\{&KCMD(k) + POLE\times KCMD(k-1) - \\ &(r1 + POLE\times b0)KSTR(k-1) - \\ &(r2 + POLE\times r1)KSTR(k-2) - \\ &(r3 + POLE\times r2)KSTR(k-3) - \\ &r3\times KSTR(k-4) - \\ &s0[KACT(k) - POLE\times KACT(k-1)]\} \end{aligned} \qquad (17a)$$

Figure 6:
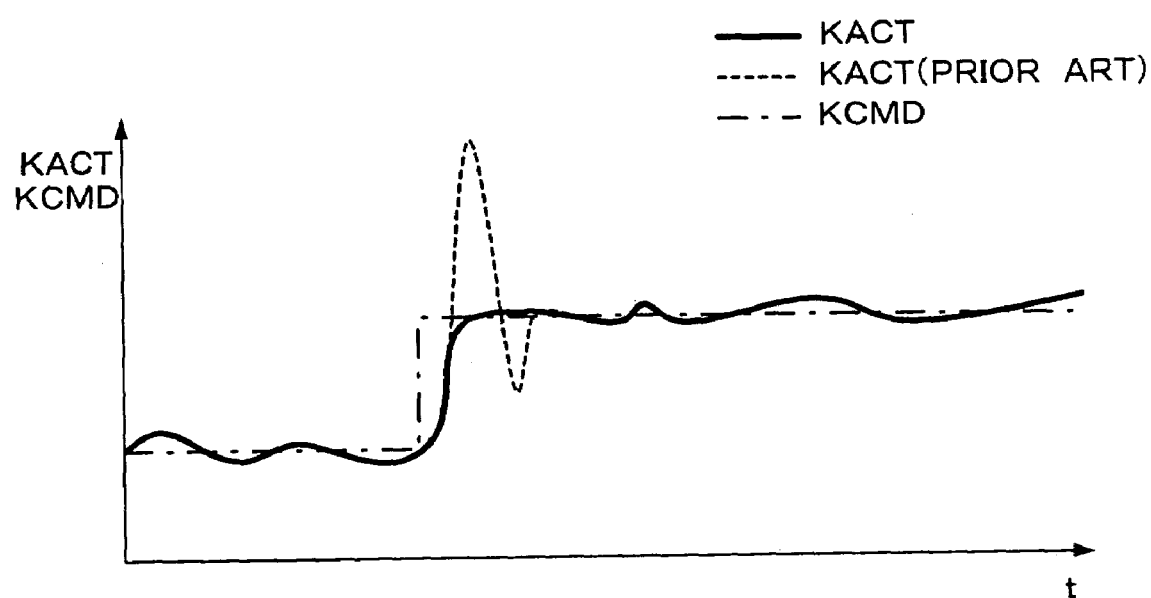
FIG. 6 is a graph showing the response characteristic of a detected equivalent ratio (KACT) in the case of a stepwise change in a target equivalent ratio (KCMD)

When using the control input KSTR(k) calculated from Eq. (20), a response characteristic, as shown by the solid line in FIG. 6, can be obtained. As such, the overshoot can be suppressed and a good follow-up characteristic can also be realized.

In an engine operating condition where the overshoot with respect to the target equivalent ratio KCMD is unlikely to occur, using the damping control input KSTRDMP and specifying a response characteristic such that the damping characteristic of the deviation e(k) may become gradual (the follow-up speed may decrease), tends to lower the follow-up characteristic of the detected equivalent ratio KACT with respect to the target equivalent ratio KCMD. Accordingly, in the engine operating condition where the overshoot is unlikely to occur, it is preferable to set the damping gain KDAMP and the response specifying parameter POLE so that the overshoot suppressing effect is reduced.

In this embodiment, the function of each block shown in FIG. 2 is realized by the operation of the CPU 5b of the ECU 5. A calculation process of the control input (self-tuning correction coefficient) KSTR(k) will now be described with reference to the flowcharts shown in FIGS. 7 to 11.

Figure 7:
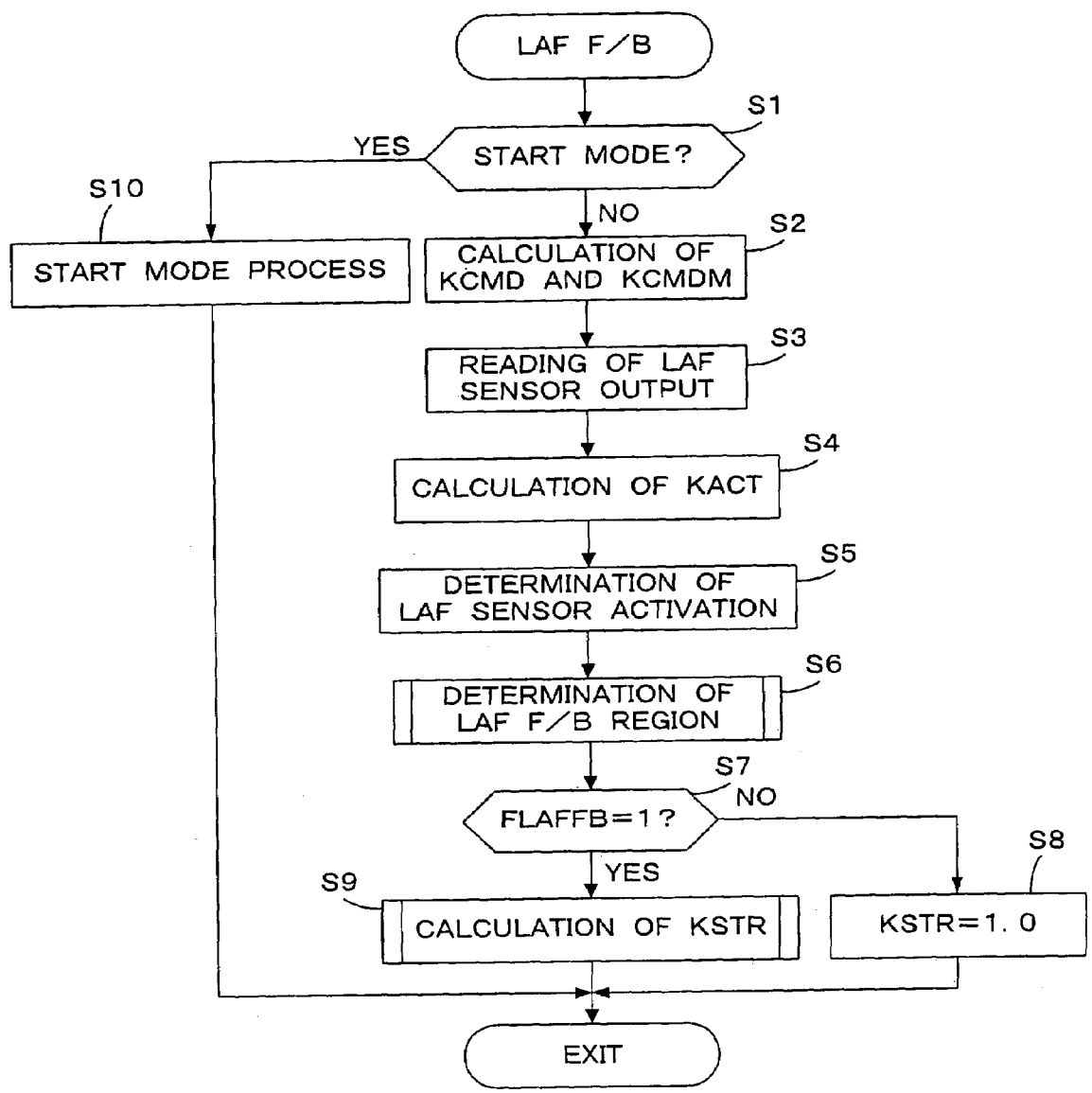
FIG. 7 is a flowchart showing a program for calculating a self-tuning correction coefficient (KSTR) according to an air-fuel ratio sensor output.

FIG. 7 is a flowchart showing the process of calculating the self-tuning correction coefficient (control input) KSTR according to the output from the LAF sensor 17. This process is executed in synchronism with the generation of a TDC signal pulse (at every 240 deg crank angle).

In step S1, it is determined whether or not the engine 1 is in a start mode, i.e., during cranking. If the engine 1 is in the start mode, the program proceeds to a start mode process (step S10). If the engine 1 is not in the start mode, the target air-fuel ratio coefficient (target equivalent ratio) KCMD and the final target air-fuel ratio coefficient KCMDM are calculated (step S2), and the output from the LAF sensor 17 is read (step S3). Thereafter, the detected equivalent ratio KACT is calculated (step S4). The detected equivalent ratio KACT is obtained by converting the output from the LAF sensor 17 to an equivalent ratio.

In step S5, it is determined whether or not the activation of the LAF sensor 17 has been completed. For example, this activation determination may be made by comparing a difference between an output voltage from the LAF sensor 17 and its center voltage, with a predetermined value (e.g., 0.4 V). When the difference is less than the predetermined value, it is determined that the activation has been completed. Then, a LAF sensor activation flag FLSA is set to "1".

Figure 8:
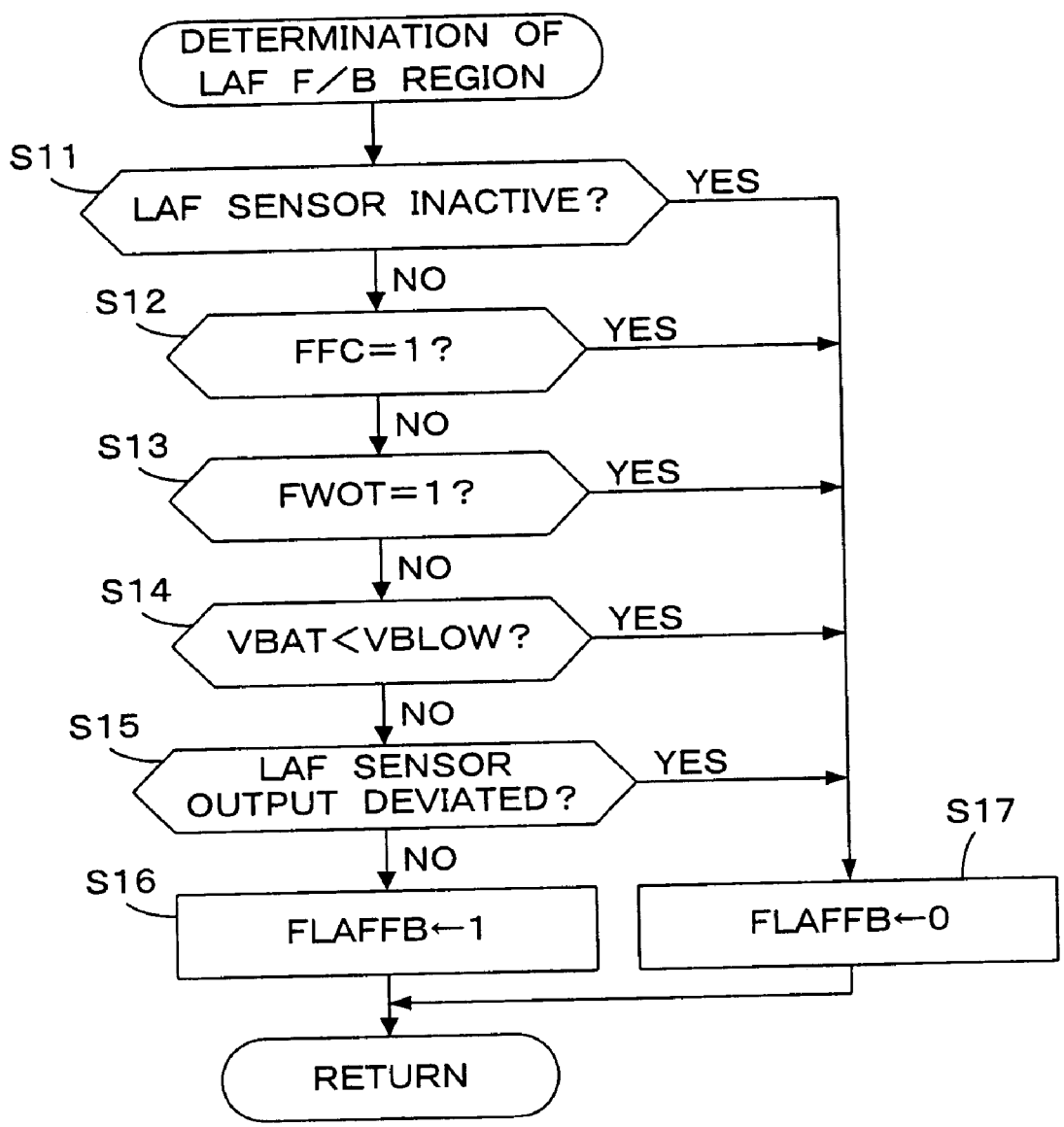
FIG. 8 is a flowchart showing a program for determining the condition for execution of feedback control according to an air-fuel ratio sensor output.

Next, it is determined whether or not the engine operating condition is in an operational region where the feedback control according to the output from the LAF sensor 17 is performed (which operational region will be hereinafter referred to as "LAF feedback region") (step S6). The process of step S6 is specifically shown in FIG. 8. In the process of FIG. 8, a LAF feedback flag FLAFFB is set to "0", when the engine operating condition is not in the LAF feedback region. When the engine operating condition is in the LAF feedback region, the LAF feedback flag FLAFFB is set to "1".

Figure 9:
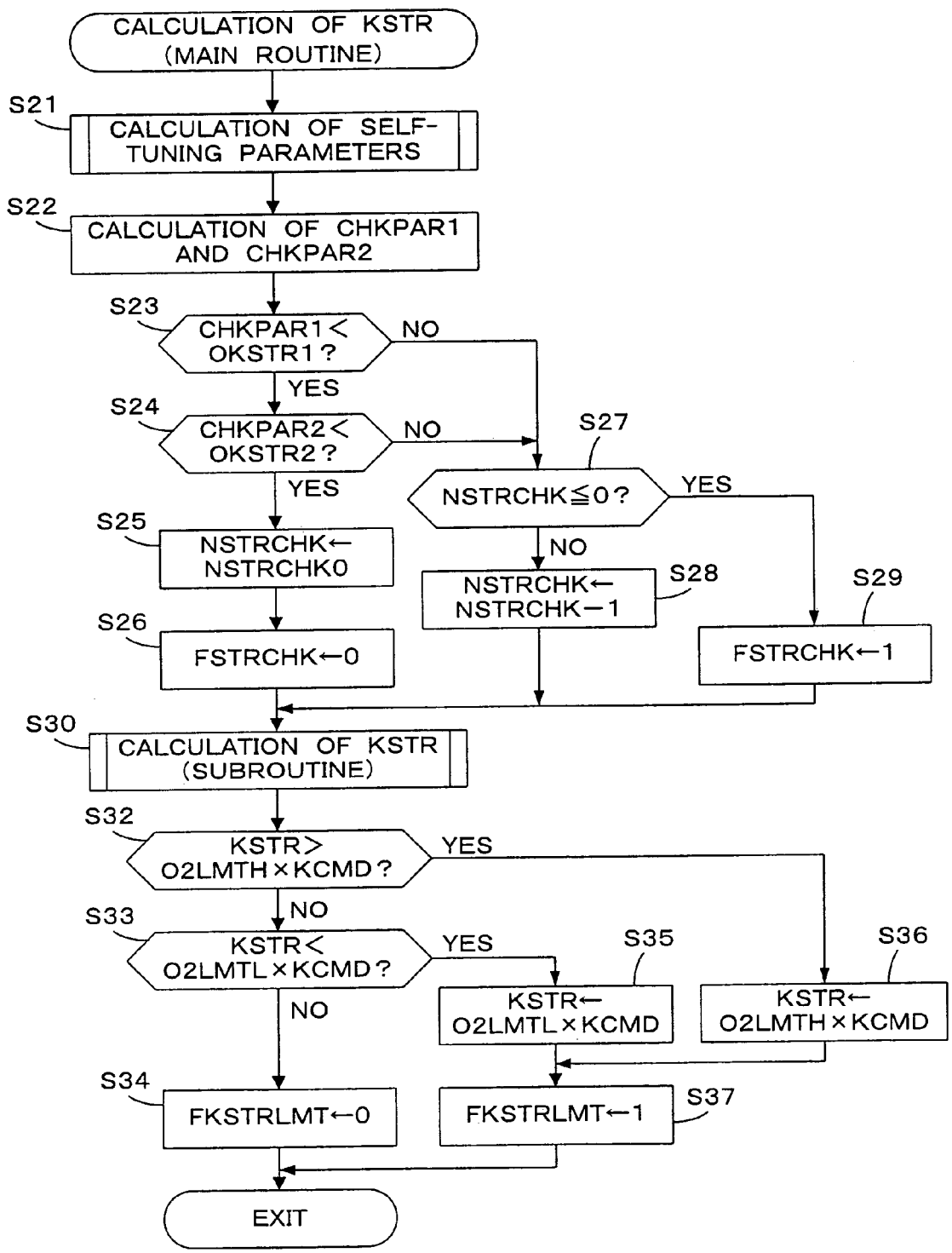
FIG. 9 is a flowchart showing a main routine of the self-tuning correction coefficient calculation process.

In step S7, it is determined whether or not the LAF feedback flag FLAFFB is "1". If FLAFFB is "0", the program proceeds to step S8 to set the self-tuning correction coefficient KSTR to "1.0". Thereafter, this process ends. If FLAFFB is "1", a calculation process of the self-tuning correction coefficient KSTR shown in FIG. 9 is executed (step S9). Thereafter, this process ends.

FIG. 8 is a flowchart showing the LAF feedback region determination process executed in step S6 shown in FIG. 7.

In step S11, it is determined whether or not the LAF sensor 17 is inactive. Specifically, it is determined whether or not the LAF sensor activation flag FLSA is "0". If the LAF sensor 17 is active (FLSA=1), it is determined whether or not a fuel cutoff flag FFC is "1" (step S12). The fuel cutoff flag FFC is set to "1", when a fuel-cut operation of cutting off the supply of fuel to the engine is being performed. If FFC is "0", it is determined whether or not a wide-open throttle flag FWOT is "1" (step S13). The wide-open throttle flag FWOT is set to "1", when the throttle valve 3 is in a fully open condition. If FWOT is "0", it is determined whether or not a battery voltage VBAT detected by a sensor (not shown) is lower than a predetermined lower limit VBLOW (step S14). If VBAT is higher than or equal to VBLOW, it is determined whether or not the LAF sensor output corresponding to the stoichiometric ratio has deviated (step S15). If the answer to any one of steps S11 to S15 is affirmative (YES), the LAF feedback flag FLAFFB is set to "0" (step S17). The LAF feedback flag FLAFFB is set to "1", when the feedback control according to the LAF sensor output is executable.

If all of the answers to steps S11 to S15 are negative (NO), it is determined that the feedback control according to the LAF sensor output is executable, and the LAF feedback flag FLAFFB is set to "1" (step S16).

FIG. 9 is a flowchart showing a main routine of the KSTR calculation process executed in step S9 shown in FIG. 7.

Figure 10:
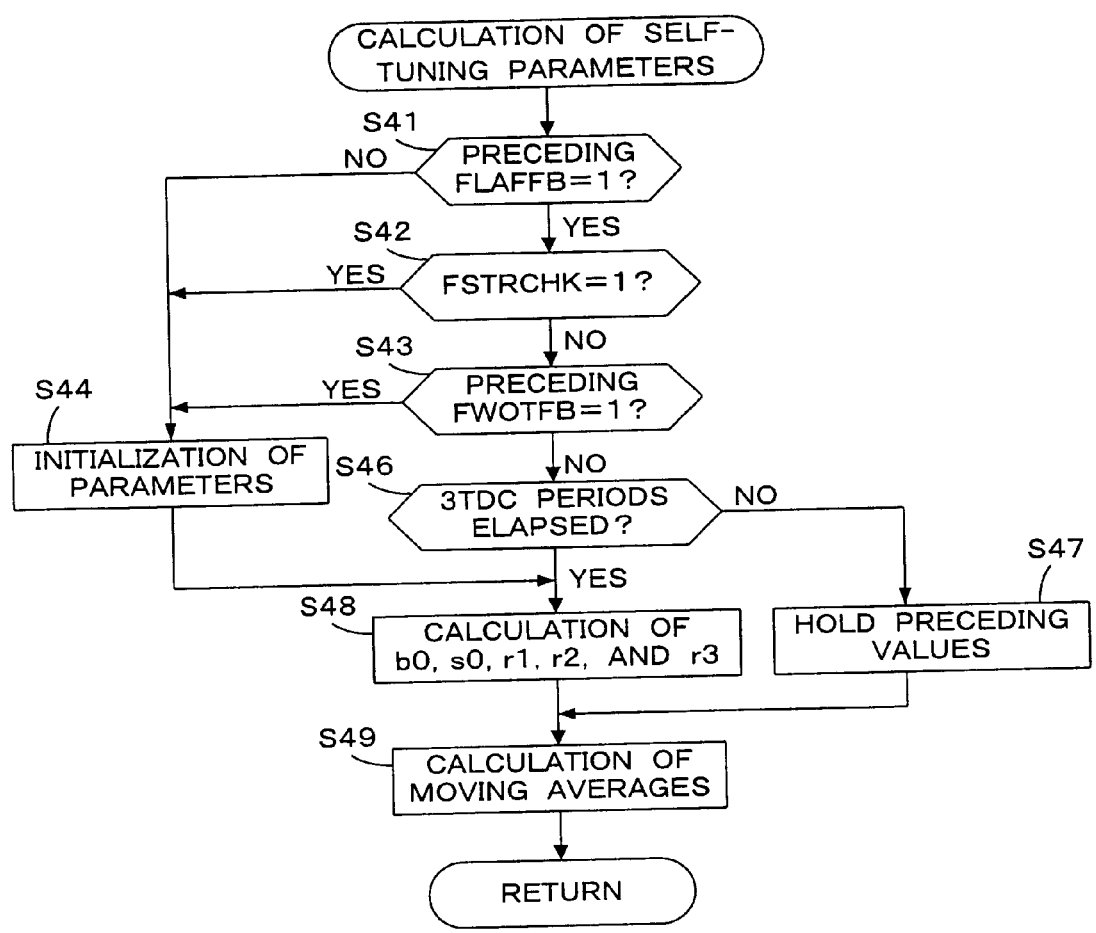
FIG. 10 is a flowchart showing a program for calculating self-tuning parameters.

In step S21, a self-tuning parameter computation process shown in FIG. 10 is executed. In the process shown in FIG. 10, the self-tuning parameters (model parameters) b0, s0, and r1 to r3 are calculated, and moving averages b0AV, s0AV, r1AV, r2AV, and r3AV of these parameters are also calculated. In step S22, the moving averages b0AV, s0AV, r1AV, r2AV, and r3AV are applied to Eqs. (21) and (22) shown below to calculate first and second stability determination parameters CHKPAR1 and CHKPAR2.

$$CHKPAR1 = (r1AV - r2AV + r3AV + s0AV)/b0AV \quad (21)$$

$$CHKPAR2 = |r1AV| + |r2AV| + |r3AV| \quad (22)$$

In step S23, it is determined whether or not the first stability determination parameter CHKPAR1 is less than a first determination threshold OKSTR1 (e.g., 0.6). If CHKPAR1 is less than OKSTR1, it is further determined whether or not the second stability determination parameter CHKPAR2 is less than a second determination threshold OKSTR2 (e.g., 0.4) (step S24). If CHKPAR2 is less than OKSTR2, it is determined that the self-tuning parameters are stable, and a downcounter NSTRCHK is set to a predetermined value NSTRCHK0 (e.g., 4) (step S25). Further, a stability determination flag FSTRCHK is set to "0" (step S26). The stability determination flag FSTRCHK indicates that the self-tuning parameters are stable when it is set to "0".

If the answer to step S23 or S24 is negative (NO), it is determined whether or not the value of the downcounter NSTRCHK is less than or equal to "0" (step S27). Initially, NSTRCHK is greater than "0", so that the value of the downcounter NSTRCHK is decreased in increments of "1" (step S28). Thereafter, the program proceeds to step S30. When the value of the downcounter NSTRCHK becomes "0", the program proceeds from step S27 to step S29, in which the stability determination flag FSTRCHK is set to "1".

Figure 11:
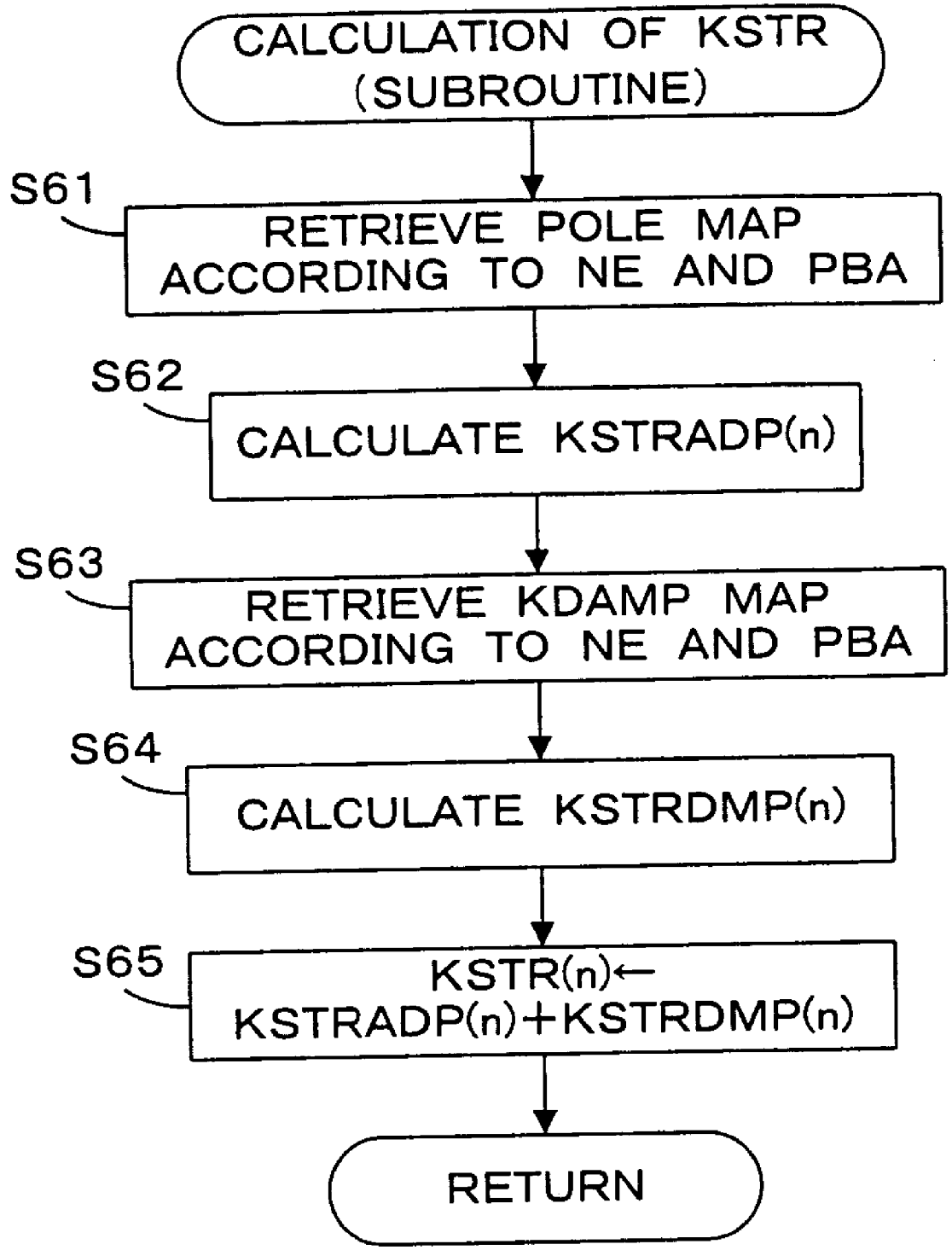
FIG. 11 is a flowchart showing a subroutine of the self-tuning correction coefficient calculation process.

In step S30, a KSTR calculation subroutine shown in FIG. 11 is executed to calculate the self-tuning correction coefficient KSTR(k).

In steps S32 to S37, a limit process of the self-tuning correction coefficient KSTR is executed. More specifically, if the self-tuning correction coefficient KSTR is greater than an upper limit (O2LMTH×KCMD) obtained by multiplying the target equivalent ratio KCMD by an upper limit coefficient O2LMTH (e.g., 1.2), the self-tuning correction coefficient KSTR is set to the upper limit (O2LMTH×KCMD) (steps S32 and S36). If the self-tuning correction coefficient KSTR is less than a lower limit (O2LMTL×KCMD) obtained by multiplying the target equivalent ratio KCMD by a lower limit coefficient O2LMTL (e.g., 0.5), the self-tuning correction coefficient KSTR is set to the lower limit (O2LMTL×KCMD) (steps S33 and S35). In these cases, a limit flag FKSTRLMT is set to "1", so as to indicate that the self-tuning correction coefficient KSTR has been set to the upper limit or the lower limit (step S37). If the self-tuning correction coefficient KSTR falls between the upper limit and the lower limit, the limit flag FKSTRLMT is set to "0" (step S34).

FIG. 10 is a flowchart showing the self-tuning parameter calculation process executed in step S21 shown in FIG. 9.

In step S41, it is determined whether or not the LAF feedback flag FLAFFB in the preceding execution of the process shown in FIG. 7 was "1". If FLAFFB was "1" in the previous execution, it is determined whether or not the stability determination flag FSTRCHK is "1" (step S42). If FSTRCHK is "0", which indicates that the self-tuning parameters are stable, it is determined whether or not a high-load feedback flag FWOTFB in the preceding execution of the process shown in FIG. 7 was "1" (step S43). The high-load feedback flag FWOTFB is set to "1" by a process (not shown) when executing the feedback control to a rich target air-fuel ratio which is richer than the stoichiometric ratio (rich air-fuel ratio feedback control). This flag FWOTFB is set to "0" when executing the feedback control to the stoichiometric ratio (stoichiometric ratio feedback control).

If the answer to step S41 is negative (NO), or the answer to step S42 or S43 is affirmative (YES), initialization of the parameters is executed (step S44). More specifically, the latest values and past values of the self-tuning correction coefficient KSTR, the detected equivalent ratio KACT, and the target equivalent ratio KCMD stored in the memory are all set to "1.0". Further, the latest value and past values of the self-tuning parameter b0 are all set to "1.0", and the moving average b0AV is set to "1.0". Furthermore, the latest values and past values of the other self-tuning parameters r1 to r3 and s0 are all set to "0", and the corresponding moving averages r1AV, r2AV, r3AV, and s0AV are all set to "0". After ending this initialization of the parameters, the program proceeds to step S48.

When the high-load feedback flag FWOTFB in the preceding execution was "1", this indicates that the feedback control has been returned from the rich air-fuel ratio feedback control to the stoichiometric ratio feedback control. Proper parameter values suitable for the rich air-fuel ratio feedback control are largely different from proper parameter values suitable for the stoichiometric ratio feedback control. Therefore, immediately after the transition from the rich air-fuel ratio feedback control to the stoichiometric ratio feedback control, there is a possibility that the control may become unstable. To prevent this problem, the above initialization of the parameters is carried out.

If the answer to step S43 is negative (NO), it is determined whether or not 3 TDC periods (a time period equivalent to three periods of the TDC signal pulse, i.e., one combustion cycle in this embodiment) have elapsed from the time of the preceding calculation of the self-tuning parameters (step S46). The model defined by Eq. (1) and the control input calculated from Eqs. (2) to (17) are defined with a sample/control period which is in synchronism with a combustion cycle k (=n/3 where n is the TDC cycle) of a specific cylinder. Therefore, in this embodiment, the calculation of the self-tuning parameter vector θ (k)., i.e., the self-tuning parameters b0, s0, and r1 to r3, is performed once every 3 TDC periods in synchronism with a combustion cycle of a specific cylinder. Accordingly, if the answer to step S46 is affirmative (YES), the calculation of the self-tuning parameters b0, s0, and r1 to r3 can be performed for example, in accordance with Eq. (3a) shown below (step S48). In Eq. (3a), KP(n) and ide(n) are defined by Eqs. (4a), (5a), and (7a) shown below. The symbol "k" in Eqs. (1) to (17) indicates a sampling time corresponding to a combustion cycle period. The symbol "n" in the equations shown below indicates a sampling time corresponding to a TDC period (period corresponding to 240 deg crank angle in this embodiment):

$$\theta(n) = EPS\theta(n-1) + KP(n)\text{ide}(n) \tag{3a}$$

$$KP(n) = \frac{P\zeta(n)}{1 + \zeta^T(n)P\zeta(n)} \tag{4a}$$

$$\text{ide}(n) = KACT(n) - \theta(n-1)^T \zeta(n) \tag{5a}$$

$$EPS = [1, \epsilon, \epsilon, \epsilon, \epsilon] \tag{6}$$

$$\zeta(n)^T = [KSTR(n-6), KSTR(n-9), KSTR(n-12), KSTR(n-15), KACT(n-6)] \tag{7a}$$

If 3 TDC periods have not elapsed in step S46, the self-tuning parameters b0(n), s0(n), and r1(n) to r3(n) are set to the preceding values b0(n−1), s0(n−1), and r1(n−1) to r3(n−1), respectively (step S47).

In step S49, the moving averages b0AV, s0AV, r1AV, r2AV, and r3AV are calculated from Eqs. (25) to (29) shown below:

$$b0AV = \sum_{i=0}^{11} b0(n-i)/12 \tag{25}$$

$$s0AV = \sum_{i=0}^{11} s0(n-i)/12 \tag{26}$$

$$r1AV = \sum_{i=0}^{11} r1(n-i)/12 \tag{27}$$

$$r2AV = \sum_{i=0}^{11} r2(n-i)/12 \tag{28}$$

$$r3AV = \sum_{i=0}^{11} r3(n-i)/12 \tag{29}$$

By using the self-tuning parameters b0AV, s0AV, r1AV, r2AV, and r3AV obtained by the moving average calculation to calculate the self-tuning control input KSTRADP, the self-tuning parameter vector θ can be updated once every 3 TDC periods, and unstable behavior of the self-tuning regulator due to the low-pass characteristic of the LAF sensor 17 can be prevented.

FIG. 11 is a flowchart of the KSTR calculation subroutine executed in step S30 shown in FIG. 9.

Figure 12A:
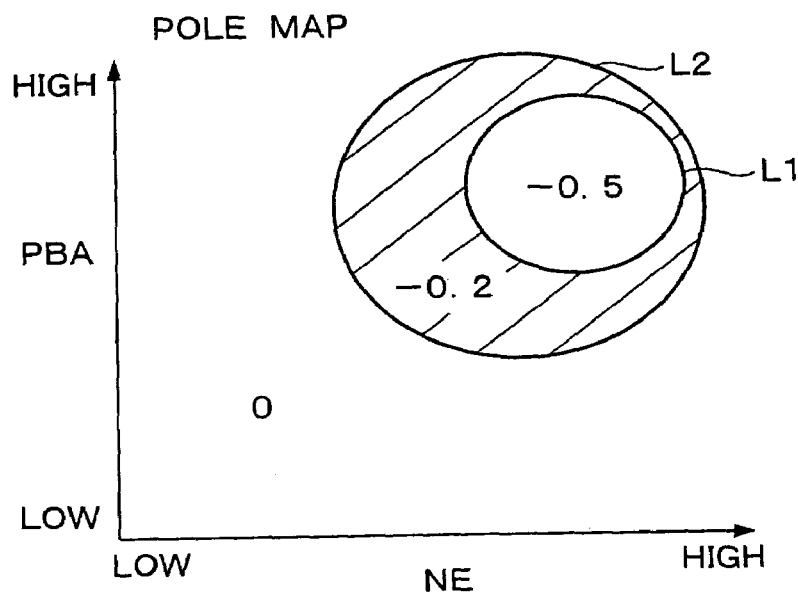
FIGS. 12A and 12B are graphs showing maps used in the process of FIG. 11.

In step S61, a POLE map shown in FIG. 12A is retrieved according to the engine rotational speed NE and the absolute intake pressure PBA to calculate the response specifying parameter POLE. The POLE map is set so that the response speed is low in a high-load and high-speed operating condition of the engine. More specifically, as shown in FIG. 12A, the response specifying parameter POLE is set to "−0.5" in a region surrounded by the line L1, set to "−0.2" in a region surrounded by the line L2 exclusive of the region surrounded by the line L1 (i.e., a hatched region), and set to "0" in a region outside of the line L2.

Thereafter, the self-tuning control input KSTRADP(n) is calculated from Eq. (17b), shown below (step S62):

$$\begin{aligned}KSTRADP(n) = & \quad (17b)\\
& (1/b0AV)\{KCMD(n) + POLE \times KCMD(n-3) - \\
& (r1AV + POLE \times b0)KSTR(n-3) - \\
& (r2AV + POLE \times r1)KSTR(n-6) - \\
& (r3AV + POLE \times r2)KSTR(n-9) - \\
& r3AV \times KSTR(n-12) - \\
& s0AV[KACT(n) - POLE \times KACT(n-3)]\}\end{aligned}$$

Eq. (17b) is given by substituting the moving averages b0AV, r1AV to r3AV, and s0AV for the self-tuning parameters b0, r1 to r3, and s0 in Eq. (17a), respectively, and changing "k" indicative of a discrete time to "n".

Figure 12B:
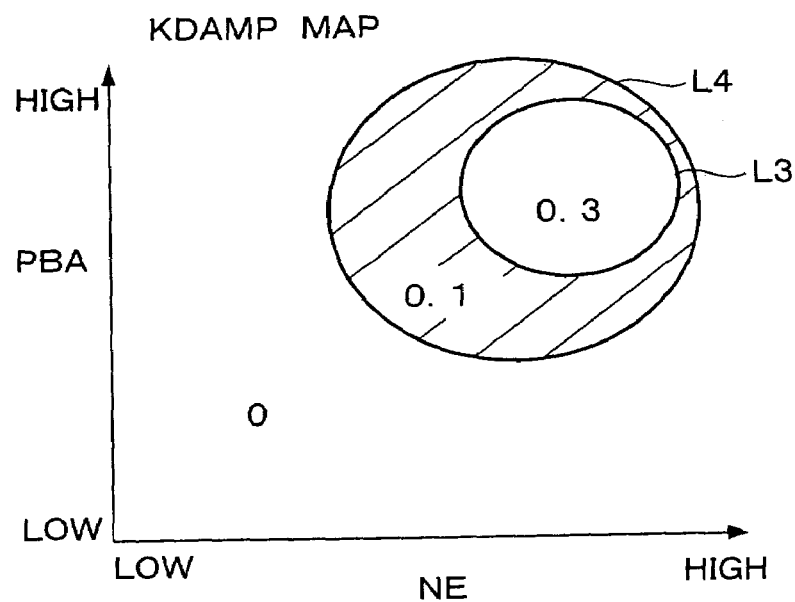

In step S63, a KDAMP map shown in FIG. 12B is retrieved according to the engine rotational speed NE and the absolute intake pressure PBA to calculate the damping gain KDAMP. The KDAMP map is set so that the damping gain KDAMP is large in a high-load and high-speed operating condition of the engine. More specifically, as shown in FIG. 12B, the damping gain KDAMP is set to "0.3" in a region surrounded by the line L3, set to "0.1" in a region surrounded by the line L4 exclusive of the region surrounded by the line L3 (i.e., a hatched region), and set to "0" in a region outside of the line L4.

In step S64, the damping control input KSTRDMP(n) is calculated from Eq. (19a) shown below. Thereafter, the self-tuning correction coefficient (control input) KSTR(n) is calculated from Eq. (20a), shown below (step S65):

$$KSTRDMP(n) = -KDAMP \times [KACT(n) - KACT(n-3)] \tag{19a}$$

$$KSTR(n) = KSTRADP(n) + KSTRDMP(n) \tag{20a}$$

Thus, the self-tuning control input KSTRADP is first calculated from Eq. (17b), the damping control input KSTRDMP is next calculated from Eq. (19a), and the control input KSTR(n) is finally calculated as the sum of the self-tuning control input KSTRADP and the damping control input KSTRDMP. Accordingly, the overshoot of the detected equivalent ratio KACT with respect to the target equivalent ratio KCMD can be suppressed, and a good follow-up characteristic can be obtained.

Further, the response specifying parameter POLE specifying the response speed of the control using the self-tuning control input KSTRADP is set so that the response speed is low in a high-load and high-speed engine operating condition where the overshoot is prone to occur. The damping gain KDAMP determining the degree of the damping effect of the damping control input KSTRDMP is set so that the damping gain KDAMP is large in a high-load and high-speed engine operating condition where the overshoot is prone to occur. Accordingly, in an engine operating condition where the overshoot is unlikely to occur, the follow-up characteristic to the target equivalent ratio KCMD can be improved, while in an engine operating condition where the overshoot is prone to occur, the overshoot can be reliably suppressed.

In this embodiment, the engine system shown in FIG. 3 corresponds to the plant, and the self-tuning regulator 42 shown in FIG. 3 corresponds to the air-fuel ratio control means. Further, the parameter adjusting mechanism 54 corresponds to the identifying means, and the response specifying type controller 55 corresponds to the control means. More specifically, the process shown in FIG. 9 corresponds to the air-fuel ratio control means. The process shown in FIG. 11 corresponds to the control means, and the process shown in FIG. 10 corresponds to the identifying means. Further, steps S61 and S62 shown in FIG. 11 correspond to the self-tuning control input calculating means or the response specifying control term calculating means, and steps S63 and S64 correspond to the damping control input calculating means or the damping control term calculating means.

Second Embodiment

Figure 13:
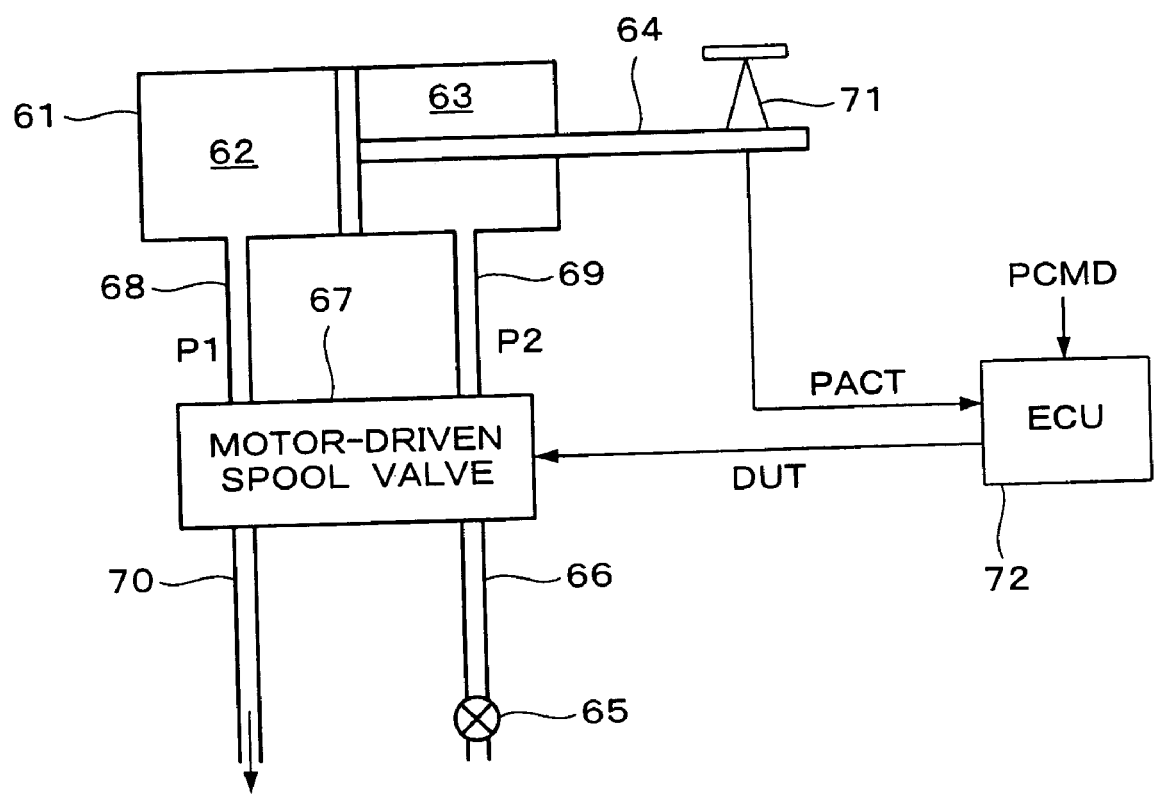
FIG. 13 is a diagram showing the configuration of a hydraulic positioning device and a control system therefor according to a second embodiment of the present invention.

FIG. 13 is a diagram showing the configuration of a hydraulic positioning device and its control system, which is a control system for a plant according to a second embodiment of the present invention. Such a hydraulic positioning device can be used for a continuously variable valve timing mechanism for continuously varying the valve timing of the intake and exhaust valves. The continuously variable valve timing mechanism changes rotational phases of the cams for driving the intake and exhaust valves to shift the opening/closing timing of the intake and exhaust valves, which improves the charging efficiency of the engine and reduces the pumping loss of the engine.

The hydraulic positioning device includes a piston 64, a hydraulic cylinder 61 in which the piston 64 is fitted, a motor-driven spool valve 67, a hydraulic pump 65, and an oil pressure supply line 66 for supplying an oil pressure from the hydraulic pump 65 to the motor-driven spool valve 67. A first oil passage 68 supplies a first oil pressure P1 to a first oil pressure chamber 62 of the hydraulic cylinder 61, a second oil passage 69 supplies a second oil pressure P2 to a second oil pressure chamber 63 of the hydraulic cylinder 61, and an oil pressure release line 70 returns a hydraulic oil discharged from the motor-driven spool valve 67 to an oil pan (not shown).

A potentiometer 71 can be provided for detecting a position PACT of the piston 64, and a signal indicating the detected position PACT is supplied to an electronic control unit (ECU) 72.

A target position PCMD is input to the ECU 72. The ECU 72 calculates a control amount DUT so that the detected position PACT coincides with the target position PCMD, and supplies an electrical signal according to the control amount DUT to the motor-driven spool valve 67.

The motor-driven spool valve 67 moves the position of a valve element (not shown) according to the control amount DUT, and outputs the first and second oil pressure P1 and P2 according to the position of the valve element. When the pressure difference DP (=P1–P2) between the first and second oil pressures P1 and P2 is a positive value, the piston 64 moves to the right as viewed in FIG. 13. When the pressure difference DP is a negative value, the piston 64 moves to the left as viewed in FIG. 13. Where the detected position PACT coincides with the target position PCMD, the pressure difference DP is maintained at "0".

Figure 14:
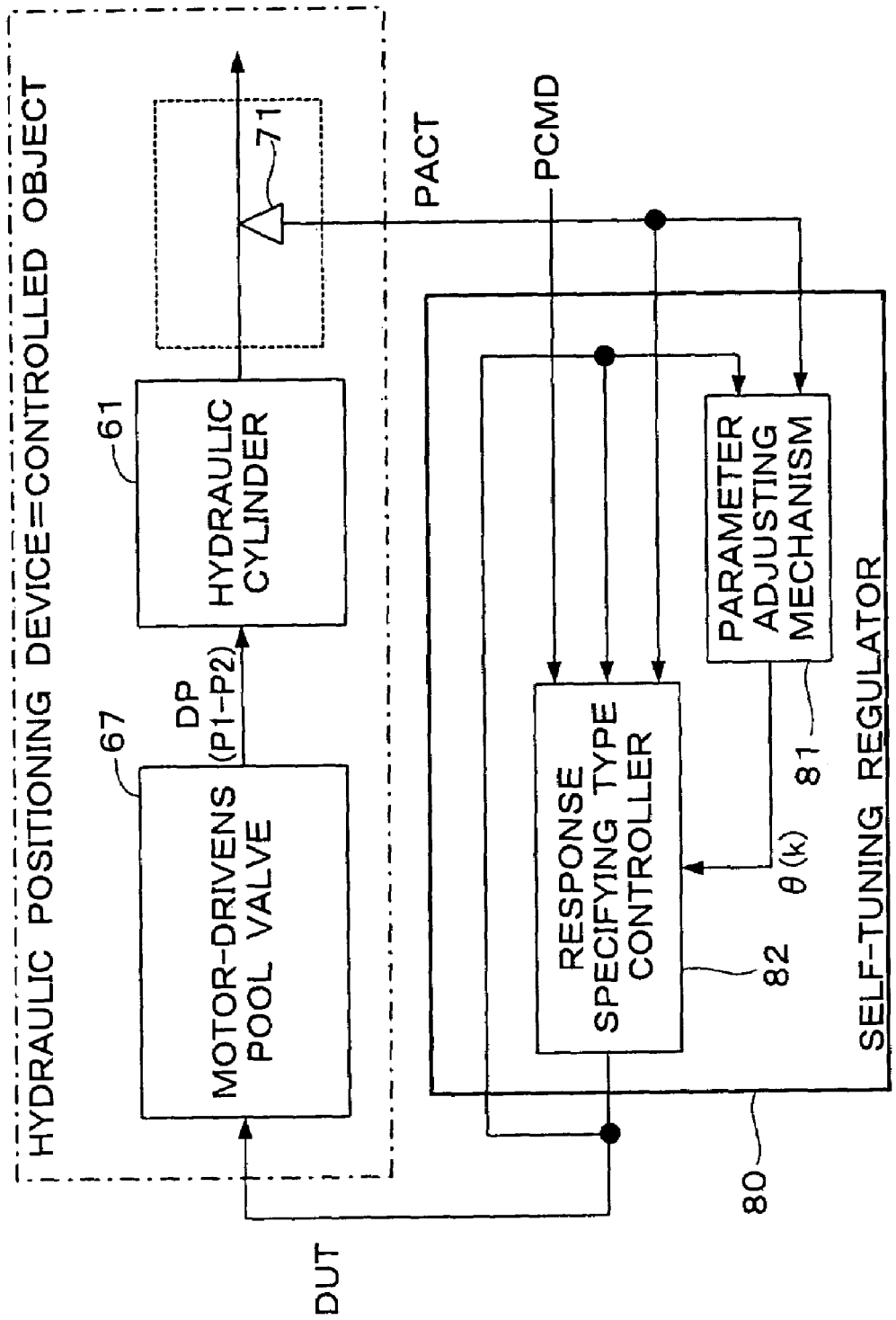
FIG. 14 is a block diagram showing the devices shown in FIG. 13.

FIG. 14 is a block diagram showing the configuration of a control system for controlling the hydraulic positioning device shown in FIG. 13 using a self-tuning regulator 80.

The self-tuning regulator 80 includes a parameter adjusting mechanism 81 and a response specifying type controller 82. The self-tuning regulator is realized by the processes executed by a CPU included in the ECU 72. Like the parameter adjusting mechanism 54 in the first embodiment, the parameter adjusting mechanism 81 calculates a model parameter vector θ (k) according to the control amount DUT as a control input and the detected position PACT as a control output. More specifically, the model parameter vector θ (k) is calculated using Eqs. (4b) and (5b) shown below and Eqs. (3) and (6) shown above. Eqs. (4b) and (5b) are given by substituting ζ'(k) defined by Eq. (7b), shown below, for ζ (k) in Eqs. (4) and (5) shown above:

$$KP(k) = \frac{P\zeta'(k)}{1 + \zeta'^T(k)P\zeta'(k)} \qquad (4b)$$

$$ide(k) = PACT(k) - \theta(k-1)^T \zeta'(k) \qquad (5b)$$

$$\zeta'(k)^T = [DUT(k-2), DUT(k-3), DUT(k-4), DUT(k-5), PACT(k-2)] \qquad (7b)$$

Like the response specifying type controller 55 in the first embodiment, the response specifying type controller 82 calculates a self-tuning control input DUTADP and a damping control input DUTDMP by applying the target position PCMD, the control input DUT, and the detected position PACT to Eqs. (17c) and (19b), shown below, and further calculates the control amount DUT as the sum of the self-tuning control input DUTADP and the damping control input DUTDMP. Eq. (17c) is given by substituting PCMD and DUT for KCMD and KSTR in Eq. (17), respectively. Eq. (19b) is given by substituting PACT for KACT in Eq. (19):

$$\begin{aligned} DUTADP(k) = (1/b0)\{ & PCMD(k) + POLE \times PCMD(k-1) - \\ & (r1 + POLE \times b0)DUT(k-1) - \\ & (r2 + POLE \times r1)DUT(k-2) - \\ & (r3 + POLE \times r2)DUT(k-3) \\ & r3 \times DUT(k-4) \\ & s0[PACT(k) \cdot POLE \times PACT(k-1)]\} \end{aligned} \qquad (17c)$$

$$DUTDMP(k) = -KDAMP \times [PACT(k) - PACT(k-1)] \qquad (19b)$$

Accordingly, the self-tuning regulator 80 can perform such a control that the control input DUT, the detected position PACT, and the target position PCMD are substituted respectively for the control input KSTR, the control output KACT, and the target equivalent ratio KCMD in the first embodiment. As a result, like the first embodiment, the overshoot of the detected position PACT with respect to the target position PCMD can be suppressed, and a good follow-up characteristic can be obtained.

In this embodiment, the hydraulic positioning device shown in FIG. 14 corresponds to the plant, and the self-tuning regulator 80 shown in FIG. 14 corresponds to the control system for the plant. Further, the parameter adjusting mechanism 81 corresponds to the identifying means, and the response specifying type controller 82 corresponds to the control means.

Other Embodiments

It should be noted that the present invention is not limited to the above embodiments, but various modifications may be made. For example, in the first embodiment, only the self-tuning control input KSTRADP may be used as the control input KSTR for the controlled object (the engine system shown in FIG. 3). In this case, the overshoot can also be suppressed as compared with the prior art. Further, the control input KSTR for the controlled object may be calculated by adding the damping control input KSTRDMP to the control input obtained by the inverse transfer function controller in the prior art. In this case, the overshoot can also be suppressed as compared with the prior art.

The damping control input KSTRDMP is calculated from Eq. (19) in the first embodiment. The damping control input KSTRDMP may be calculated from Eq. (18) according to the amount of change (the rate of change) in the deviation e(k).

The hydraulic positioning device is shown as the controlled object in the second embodiment. The control by the self-tuning regulator in the second embodiment may be applied to a pneumatic positioning device using air pressure instead of oil pressure.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for a plant, said control system comprising:
    identifying means for identifying model parameters of a controlled object model which is obtained by modeling said plant; and
    control means for calculating a control input to said plant so that an output from said plant coincides with a control target value, using the model parameters identified by said identifying means, said control means including self-tuning control input calculating means for calculating a self-tuning control input, using the model parameters identified by said identifying means, and damping control input calculating means for calculating a damping control input according to a rate of change in the output from said plant or a rate of change in a deviation between the output from said plant and the control target value,
    wherein the control input to said plant is calculated as a sum of the self-tuning control input and the damping control input.

2. The control system according to claim 1, wherein:
    said self-tuning control input calculating means calculates the self-tuning control input so that a response characteristic of the deviation between the output from said plant and the control target value becomes a specified characteristic.

3. A control system for a plant, said control system comprising:
    identifying means for identifying model parameters of a controlled object model which is obtained by modeling said plant; and
    self-tuning control input calculating means for calculating a self-tuning control input to said plant, using the model parameters identified by said identifying means, so that an output from said plant coincides with a control target value,
    wherein said self-tuning control input calculating means calculates the self-tuning control input so that a response characteristic of a deviation between the output from said plant and the control target value becomes a specified characteristic.

4. A control method for a plant, said control method comprising the steps of:
    a) identifying model parameters of a controlled object model which is obtained by modeling said plant;
    b) calculating a self-tuning control input, using the identified model parameters;
    c) calculating a damping control input according to a rate of change in an output from said plant or a rate of change in a deviation between the output from said plant and a control target value; and
    d) calculating a control input to said plant as a sum of the self-tuning control input and the damping control input, so that the output from said plant coincides with the control target value.

5. The control method according to claim 4, wherein:
    the self-tuning control input is calculated so that a response characteristic of the deviation between the output from said plant and the control target value becomes a specified characteristic.

6. A control method for a plant, said control method comprising the steps of:
    a) identifying model parameters of a controlled object model which is obtained by modeling said plant; and
    b) calculating a self-tuning control input to said plant, using the identified model parameters, wherein an output from said plant coincides with a control target value;
    wherein the self-tuning control input is calculated so that a response characteristic of a deviation between the output from said plant and the control target value becomes a specified characteristic.

7. A control system for a plant, said control system comprising:
    an identifier for identifying model parameters of a controlled object model which is obtained by modeling said plant; and
    a controller for calculating a control input to said plant so that an output from said plant coincides with a control target value, using the model parameters identified by said identifier, said controller including a self-tuning control input calculating module for calculating a self-tuning control input, using the model parameters identified by said identifier, and a damping control input calculating module for calculating a damping control input according to a rate of change in the output from said plant or a rate of change in a deviation between the output from said plant and the control target value,
    wherein the control input to said plant is calculated as a sum of the self-tuning control input and the damping control input.

8. The control system according to claim 7, wherein:
    said self-tuning control input calculating module calculates the self-tuning control input so that a response characteristic of the deviation between the output from said plant and the control target value becomes a specified characteristic.

9. A control system for a plant, said control system comprising:
   an identifier for identifying model parameters of a controlled object model which is obtained by modeling said plant; and
   a self-tuning control input calculating module for calculating a self-tuning control input to said plant, using the model parameters identified by said identifier, so that an output from said plant coincides with a control target value,
   wherein said self-tuning control input calculating module calculates the self-tuning control input so that a response characteristic of a deviation between the output from said plant and the control target value becomes a specified characteristic.

* * * * *